US012673901B2

(12) United States Patent
Nawata et al.

(10) Patent No.: US 12,673,901 B2
(45) Date of Patent: Jul. 7, 2026

(54) CERAMIC CONTINUOUS FIBERS HAVING METAL ELEMENT AND CERAMIC MATRIX COMPOSITE MATERIAL USING SAME

(71) Applicant: TOSOH CORPORATION, Shunan (JP)

(72) Inventors: Yushi Nawata, Ayase (JP); Isao Yamashita, Ayase (JP); Yo Hirataka, Ayase (JP); Ikuya Ohta, Ayase (JP)

(73) Assignee: TOSOH CORPORATION, Shunan (JP)

( * ) Notice: Subject to any disclaimer, the term of this patent is extended or adjusted under 35 U.S.C. 154(b) by 613 days.

(21) Appl. No.: 18/028,492

(22) PCT Filed: Sep. 27, 2021

(86) PCT No.: PCT/JP2021/035351
§ 371 (c)(1),
(2) Date: Mar. 24, 2023

(87) PCT Pub. No.: WO2022/071218
PCT Pub. Date: Apr. 7, 2022

(65) Prior Publication Data
US 2023/0357088 A1 Nov. 9, 2023

(30) Foreign Application Priority Data

Sep. 29, 2020 (JP) ................................. 2020-162889
Mar. 29, 2021 (JP) ................................. 2021-055040

(51) Int. Cl.
*C04B 35/622* (2006.01)
*C04B 35/80* (2006.01)
(Continued)

(52) U.S. Cl.
CPC .. *C04B 35/62236* (2013.01); *C04B 35/62245* (2013.01); *C04B 35/80* (2013.01);
(Continued)

(58) Field of Classification Search
CPC ........ C04B 35/62236; C04B 35/62245; C04B 35/80; C04B 41/5183; C04B 2235/5224; C04B 35/6225
See application file for complete search history.

(56) References Cited

U.S. PATENT DOCUMENTS

| | | | |
|---|---|---|---|
| 5,176,941 A | 1/1993 | Peuckert et al. | |
| 2006/0081323 A1 | 4/2006 | Millard et al. | |
| 2021/0094883 A1 | 4/2021 | Aikyo et al. | |

FOREIGN PATENT DOCUMENTS

| | | | |
|---|---|---|---|
| EP | 0130575 A1 | 1/1985 | |
| EP | 3950640 A1 | 2/2022 | |

(Continued)

OTHER PUBLICATIONS

JP2000160434A machine translation (Year: 2000).*
(Continued)

*Primary Examiner* — Cameron K Miller
(74) *Attorney, Agent, or Firm* — SQUIRE PATTON BOGGS (US) LLP

(57) ABSTRACT

An object is to provide metal element-having ceramic continuous fibers suitable for use in the production of highly heat-resistant CMCs, and a CMC made therewith. The ceramic continuous fibers comprise ceramic continuous fibers and at least one metal element therein, with the concentration by mass of the metal element being 10 ppm or more and 1000 ppm or less.

14 Claims, 3 Drawing Sheets

FIBER SURFACE

(51) Int. Cl.
   *C04B 41/00* (2006.01)
   *C04B 41/51* (2006.01)
(52) U.S. Cl.
   CPC ...... *C04B 41/0072* (2013.01); *C04B 41/5183* (2013.01); *C04B 2235/5224* (2013.01); *C04B 2235/5228* (2013.01); *C04B 2235/526* (2013.01)

(56) References Cited

FOREIGN PATENT DOCUMENTS

| | | | | | |
|---|---|---|---|---|---|
| JP | S60-12606 | A | | 1/1985 | |
| JP | H02-188471 | A | | 7/1990 | |
| JP | H05-321038 | A | | 12/1993 | |
| JP | H06287081 | A | * | 10/1994 | |
| JP | H06-321534 | A | | 11/1994 | |
| JP | H07-41371 | A | | 2/1995 | |
| JP | 2000160434 | A | * | 6/2000 | ......... C04B 14/4625 |
| JP | 2004-107193 | A | | 4/2004 | |
| JP | 2006-111526 | A | | 4/2006 | |
| JP | 2019-039106 | A | | 3/2019 | |
| KR | 10-1855718 | B1 | | 5/2018 | |

OTHER PUBLICATIONS

JPH06287081A machine translation (Year: 1994).*
International Search Report mailed Nov. 16, 2021, for International Application No. PCT/JP2021/035351, with translation, 7 pages.
Almeida et al., "Thermal Exposure Effects on the Strengh and Microstructure of a Noval Mullite Fiber", J. Am. Ceram. Soc., vol. 99(5), 2016, pp. 1709-1716, 8 pages.
Parlier et al., "Potential and Perspecties for Oxide/Oxide Composite", J. AerospaceLab, vol. 3, 2011, pp. 1-12, 12 pages.
Wang et al., "Effect of rare earth oxides on the properties of bio-soluble alkaline earth silicate fibers", J. Rare Earths, vol. 34(2), 2016, pp. 203-207, 5 pages.
Wilson et al., "High performance oxide fibers for metal and ceramic composites", Composites: Part A, vol. 32, 2001, pp. 1143-1153, 11 pages.
Extended European Search Report dated Jan. 14, 2025, for European Patent Application No. 21875520.5, 8 pages.
International Preliminary Report on Patentability mailed Mar. 28, 2023, for International Application No. PCT/JP2021/035351, 6 pages.
Ramanan Venkatesh et al., "Effect of organic additives on the properties of sol-gel spun alumina fibres," Journal of the European Ceramic Society, vol. 20, pp. 2543-2549, 2000.

* cited by examiner

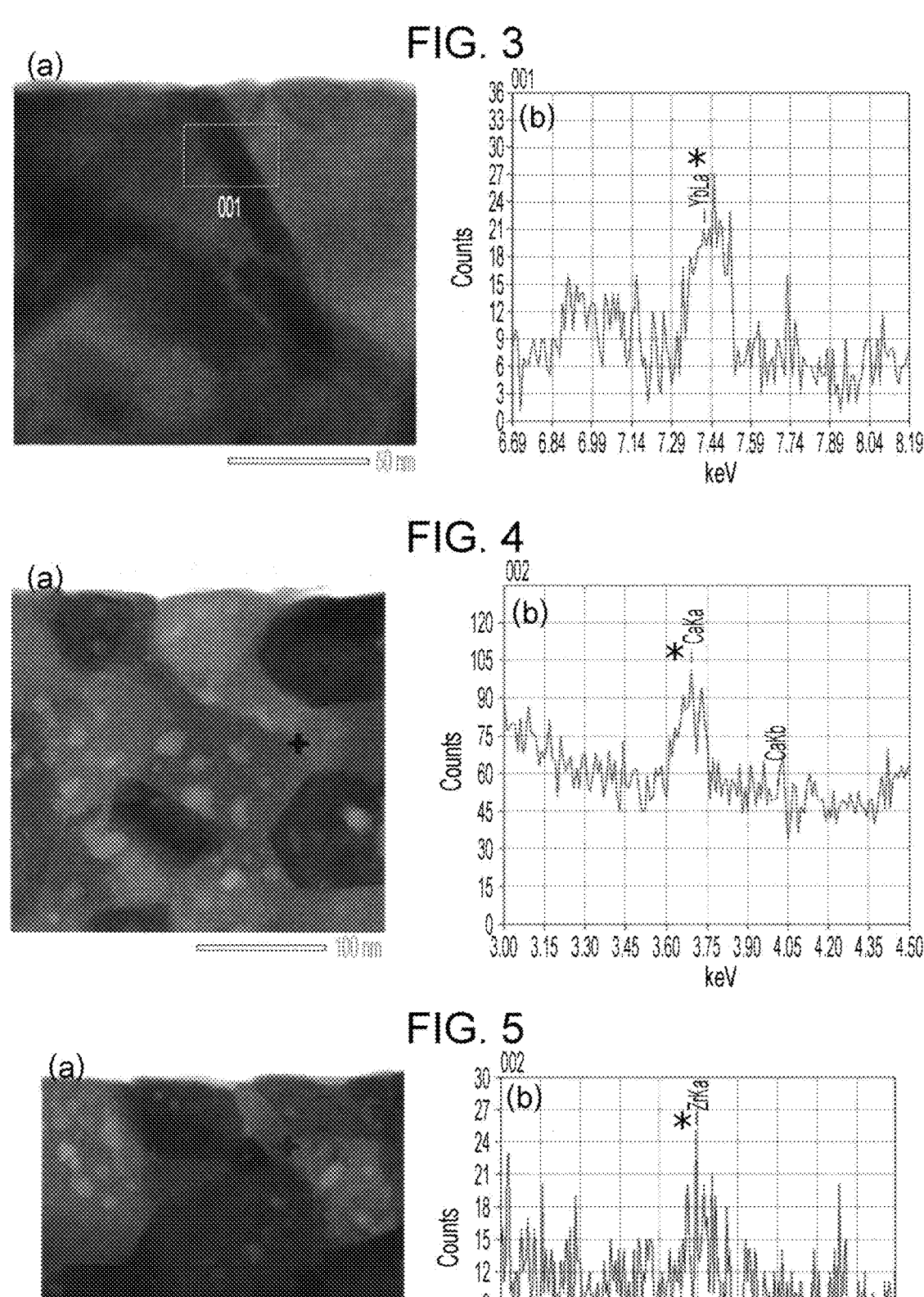

FIG. 6
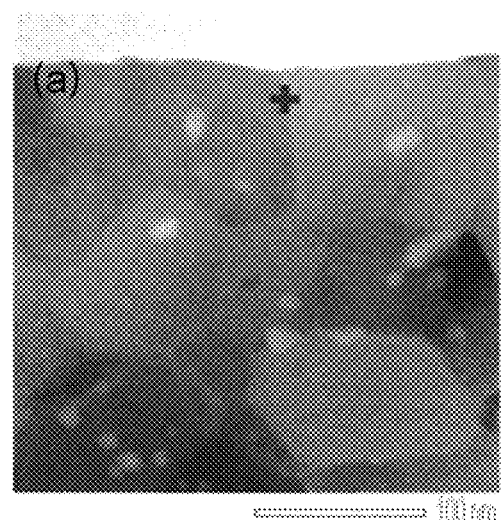
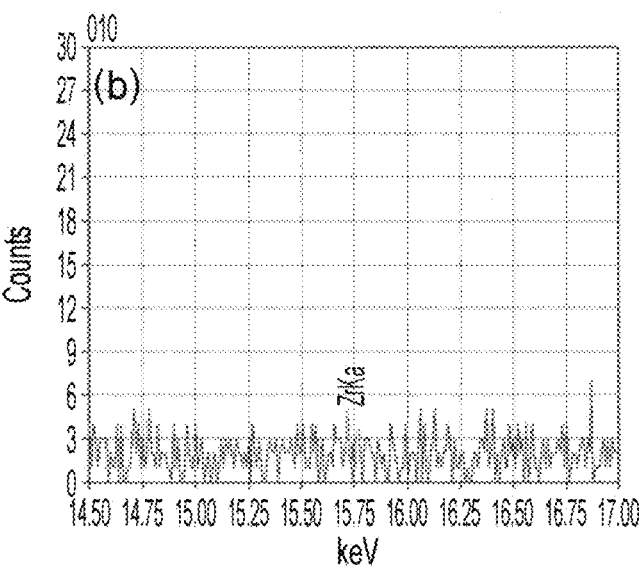

CERAMIC CONTINUOUS FIBERS HAVING METAL ELEMENT AND CERAMIC MATRIX COMPOSITE MATERIAL USING SAME

CROSS-REFERENCE TO RELATED APPLICATIONS

This application is a National Stage filing under 35 U.S.C. § 371 of International Patent Application No. PCT/JP2021/035351, filed Sep. 27, 2021, which claims the benefit of and priority to Japanese Patent Application No. 2020-162889, filed Sep. 29, 2020, and Japanese Patent Application No. 2021-055040, filed Mar. 29, 2021, the contents of all of which are hereby incorporated by reference in their entireties for all purposes.

TECHNICAL FIELD

The present invention relates to ceramic continuous fibers having a metal element and a ceramic matrix composite material made therewith.

BACKGROUND ART

Ceramic matrix composite materials (hereinafter also referred to as "CMCs"), which are composites of ceramic continuous fibers and a ceramic matrix, have tolerance to flaws (damage tolerance), a property that ordinary ceramics do not have. For this reason, studies on CMCs as an alternative to heat-resistant metals, such as Ni-based alloys, are ongoing.

In particular, oxide CMCs, made with oxides in the alumina or mullite family, are known to have high chemical stability against environmental substances, such as oxygen, steam, Ca, Mg, Na and Si. CMCs prepared with ceramic continuous fibers formed by an oxide in the alumina or mullite family are expected to be used especially as structural materials for aviation jet engines (e.g., NPL 1).

The working temperature limits of oxide CMCs are 1100° C. or below, which is lower than those of non-oxide CMCs made of silicon carbide (working temperature limits: <1500° C.). One cause is that oxide fibers are less resistant to heat than silicon carbide fibers.

Since the temperature capabilities, such as working temperature limits, of CMCs depend on the heat resistance of the fibers therein, attempts have been made to improve the heat resistance of fibers (e.g., NPL 2 to 4).

CITATION LIST

Non Patent Literature

NPL 1: J. Aerospace Lab, Issue 3, (2011) 1-12.
NPL 2: J. Am. Ceram. Soc. 99, Issue 99, (2016) 1709-1716.
NPL 3: J. Composites: Part A, Issue 32, (2001) 1143-1153.
NPL 4: J. Rare Eareth, Issue 2, (2012) 175.

SUMMARY OF INVENTION

Technical Problem

In NPL 3, zirconia and yttria are introduced into a production process for alumina fibers to limit the growth and improve the creep performance of alumina grains in the fibers. The heat resistance and creep performance of such alumina fibers, however, are not as high as those of commercially available mullite fibers (Nextel 720). In NPL 4, lanthanum oxide is mixed into a mullite precursor to inhibit thermal growth of mullite grains in mullite fibers. The temperature capability of the resulting mullite fibers was approximately 1000° C.

A typical approach to producing ceramic continuous fibers is to mix multiple precursor solutions together, in which the elements that will form the fibers are contained, thicken the mixture, spin the viscous material into fibers and fire the fibers. In NPL 3 and 4, traces of additives are added to precursor solutions containing fiber-forming elements. It is, however, difficult to disperse a trace of additive in a precursor solution uniformly, and, worse yet, the trace of additive aggregates. The additives, therefore, have failed to be effective. The production of fibers containing additives, furthermore, involves a complicated process. Meanwhile, there is a common method for adding an element into a ceramic material: ion implantation, in which ionized atoms or molecules are implanted into the material. Ion implantation, however, requires large equipment, and it is difficult to add an element uniformly into columnar ceramic continuous fibers by ion implantation.

An object of the present invention is to provide highly heat-resistant, metal element-containing ceramic continuous fibers suitable for use in the production of CMCs having high strength, and a CMC made therewith.

Solution to Problem

After extensive research to solve the above problem, the inventors found that ceramic continuous fibers containing small amount(s) of particular metal element(s) within the fibers themselves solve the above problem. This has led to the completion of the present invention.

Specifically, the present invention is as described in the claims. The gist of the present disclosure, furthermore, includes ceramic continuous fibers containing metal element(s) uniformly within the ceramic continuous fibers themselves and ceramic matrix composites (CMCs) made therewith. In particular, the gist of the present disclosure includes the ceramic continuous fibers, CMCs made therewith and methods for producing them set forth below.

[1] A ceramic continuous fiber comprising a ceramic continuous fiber and at least one metal element therein, with a concentration by mass of the metal element being 10 ppm or more and 1000 ppm or less.

[2] The ceramic continuous fiber according to [1] above, wherein the metal element is a metal element or elements that are neither iron nor aluminum.

[3] The ceramic continuous fiber according to [1] or [2] above, wherein the metal element is one or more selected from the group consisting of sodium, potassium, magnesium, calcium, strontium, barium, lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper.

[4] The ceramic continuous fiber according to any one of [1] to [3] above, wherein the metal element is one or more selected from the group consisting of lanthanum, ytterbium, lutetium, magnesium, cerium, zirconium, neodymium, titanium, calcium, yttrium and strontium.

[5] The ceramic continuous fiber according to any one of [1] to [4] above, wherein the metal element is contained in crystal grain boundaries in a ceramic material forming the ceramic continuous fiber.

[6] The ceramic continuous fiber according to any one of [1] to [5] above, wherein the metal element is in a state of at least one of grain boundary diffusion or substitutional dissolution.

[7] The ceramic continuous fiber according to any one of [1] to [6] above, wherein the ceramic continuous fiber is a continuous fiber containing at least alumina.

[8] The ceramic continuous fiber according to any one of [1] to [7] above, wherein a percentage growth of crystallites after heat treatment in an air atmosphere at 1300° C. for 100 hours calculated according to equation (1) below is 160% or less:

$$G=\{(d_b-d_a)/d_a\}\times100 \qquad (1)$$

where G is the percentage growth (%) of crystallites, $d_a$ is a size (nm) of crystallites of a fiber-forming substance in the ceramic continuous fiber before the heat treatment, and $d_b$ is a size (nm) of crystallites of the fiber-forming substance in the ceramic continuous fiber after the heat treatment.

[9] The ceramic continuous fiber according to any one of [1] to [8] above, wherein the ceramic continuous fiber is an alumina continuous fiber or mullite continuous fiber.

[10] A ceramic matrix composite material comprising the ceramic continuous fiber according to any one of [1] to [9] above.

[11] The ceramic matrix composite material according to [10] above, wherein a ceramic matrix or matrices forming the ceramic matrix composite material are at least any one selected from the group of alumina, mullite, zirconia and silica.

[12] The ceramic matrix composite material according to [10] or [11] above, wherein a difference between bulk tensile strength of the material before heat treatment in an air atmosphere at 1300° C. for 100 hours and bulk tensile strength of the material after the heat treatment is 100 MPa or less.

[13] A method for producing the ceramic continuous fiber according to any one of [1] to [9] above, the method comprising an immersion step in which a ceramic continuous fiber is immersed in a solution containing at least one metal acetylacetonate complex and a step of heating the ceramic continuous fiber at 950° C. or above and 1300° C. or below.

[14] The method according to [13] above for producing a ceramic continuous fiber, wherein the metal acetylacetonate complex is an acetylacetonate complex or complexes containing one or more selected from the group of lanthanum, ytterbium, lutetium, magnesium, zirconium, cerium, yttrium, titanium, sodium, potassium, calcium, scandium, vanadium, chromium, manganese, cobalt, nickel, copper, zinc, gallium and strontium.

[15] A method for producing a ceramic matrix composite material, the method comprising combining the ceramic continuous fiber according to any one of [1] to [9] above and a ceramic matrix into a composite.

Advantageous Effects of Invention

According to the present invention, there can be provided highly heat-resistant, metal element-containing ceramic continuous fibers suitable for use in the production of CMCs having high strength, and a CMC made therewith.

BRIEF DESCRIPTION OF DRAWINGS

FIGS. 1 (b) to (e)

Figure 1:
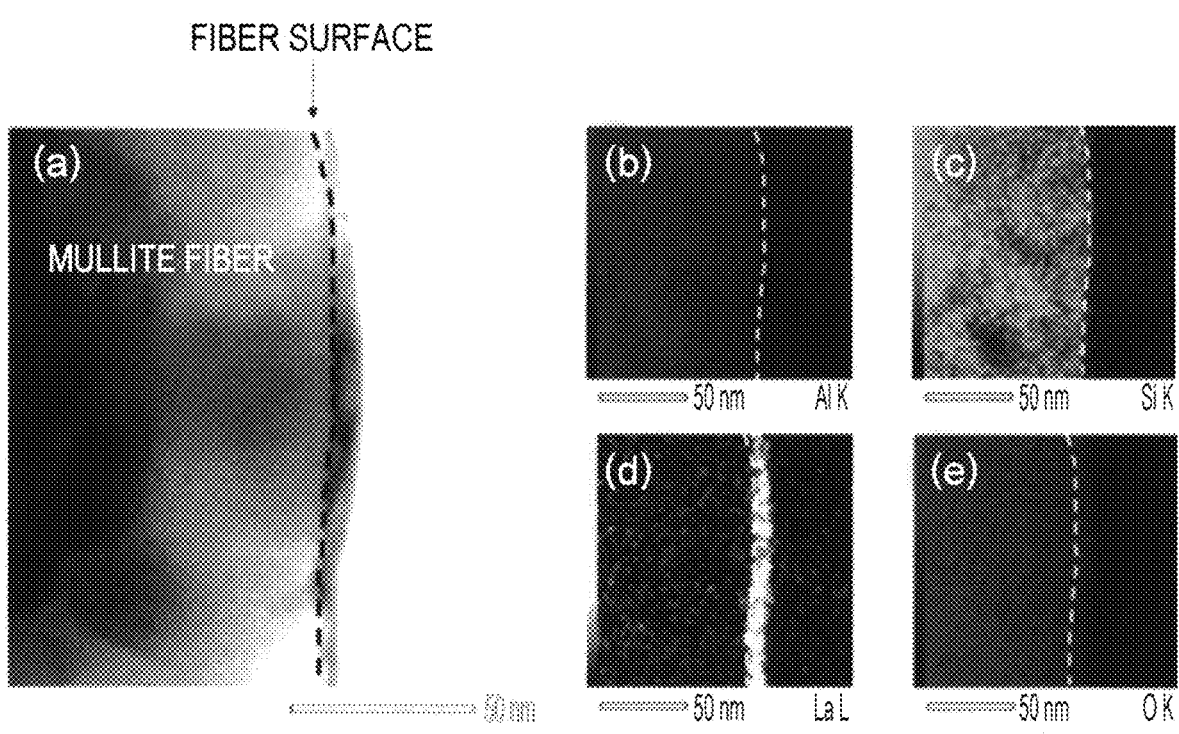
FIG. 1 (a) is a TEM image of a lanthanum oxide-coated mullite continuous fiber of Example A1.

are images indicating the distribution of aluminum (FIG. 1 (b)), silicon (FIG. 1 (c)), lanthanum (FIG. 1 (d)) and oxygen (FIG. 1 (e)), respectively, in the lanthanum oxide-coated mullite continuous fiber in FIG. 1 (a) measured by EDS.

Figure 2:
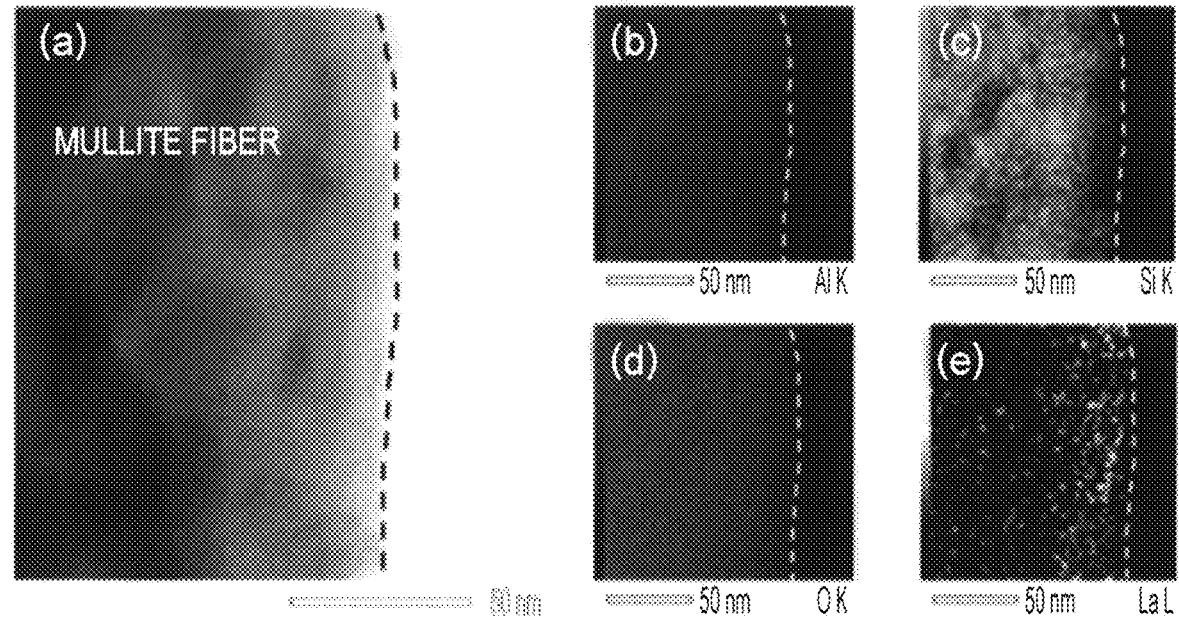

FIG. 2 (a) is a TEM image of a lanthanum-containing mullite continuous fiber of Example A1. FIGS. 2 (b) to (d) are images indicating the distribution of aluminum (FIG. 2 (b)), silicon (FIG. 2 (c)), oxygen (FIG. 2 (d)) and lanthanum (FIG. 2 (e)), respectively, in the lanthanum-containing mullite continuous fiber in FIG. 2 (a) measured by EDS.

FIG. 3 includes a STEM image of a cross-section of an ytterbium-containing mullite continuous fiber of Example A8 (FIG. 3 (a)) and an extracted STEM-EDS spectrum from the region inside the rectangle in FIG. 3 (a) (FIG. 3 (b)).

FIG. 4 includes a STEM image of a cross-section of a calcium-containing alumina continuous fiber of Example A14 (FIG. 4 (a)) and an extracted STEM-EDS spectrum from the point indicated by the cross in FIG. 4 (a) (FIG. 4 (b)).

FIG. 5 includes a STEM image of a cross-section of a zirconium-containing alumina continuous fiber of Example A16 (FIG. 5 (a)) and an extracted STEM-EDS spectrum from the point indicated by the cross in FIG. 5 (a) (FIG. 5 (b)).

FIG. 6 includes a STEM image of a cross-section of a zirconium oxide-coated alumina continuous fiber of Comparative Example A4 (FIG. 6 (a)) and an extracted STEM-EDS spectrum from the point indicated by the cross in FIG. 6 (a) (FIG. 6 (b)).

DESCRIPTION OF EMBODIMENTS

The present invention will now be described in detail with reference to an exemplary embodiment. The definitions of terms herein are as follows. A range described with "to" herein includes its lower and upper limits and means equal to or more than the lower limit and equal to or less than the upper limit.

In the present invention, "continuous fibers" represents thread-shaped long-length fibers, or more specifically thread-shaped long-length fibers that can be woven on a loom, meaning that the fibers are not staple fibers in particular. "Ceramic fibers" are a polycrystalline ceramic material spun into fibers, or more specifically a thread-shaped polycrystalline ceramic material. Ceramic fibers, furthermore, can be categorized into "ceramic staple fibers" and "ceramic continuous fibers" according to their fiber length. Ceramic staple fibers represent ceramic fibers shorter than 500 μm in fiber length. "Ceramic continuous fibers," on the other hand, refers to continuous fibers made of a ceramic material, ceramic fibers other than ceramic staple fibers (ceramic fibers 500 μm or longer in fiber length) in particular. Ceramic fiber(s) may be one independent fiber or may be an assembly of two or more fibers (hereinafter also referred to as "fiber bundle").

"Ceramic continuous fibers comprising ( . . . ) at least one metal element" are continuous fibers having a structure in which metal element(s) is contained in the internal structure of ceramic fibers, for example, as a result of grain boundary diffusion, substitutional dissolution or interstitial dissolution. In particular, this term refers to ceramic continuous fibers containing metal element(s) between the crystal grains of (in the crystal grain boundaries in) the polycrystalline ceramic material forming them, the metal element(s) being different from that (those) in the polycrystalline ceramic material. In the present invention, furthermore, "ceramic continuous fibers comprising ( . . . ) at least one metal element" is used interchangeably with "metal-containing ceramic continuous fibers." "Ceramic fiber cloth" is a textile made from ceramic fibers, especially a textile made from ceramic continuous fibers.

The present invention is ceramic continuous fibers comprising ceramic continuous fibers and at least one metal element therein, with the concentration by mass of the metal element being 10 ppm or more and 1000 ppm or less (hereinafter also referred to as "ceramic continuous fibers according to the present invention" or "metal-containing ceramic continuous fibers according to the present invention"). Preferably, the ceramic continuous fibers according to the present invention are ceramic continuous fibers having at least one metal element in which the concentration by mass of the metal element is 10 ppm or more and 1000 ppm or less. More preferably, the present invention is metal-containing ceramic continuous fibers that are ceramic continuous fibers in which the amount of metal element(s) is 10 ppm or more and 1000 ppm or less.

The ceramic continuous fibers (metal-containing ceramic continuous fibers) according to the present invention can be of any type, as long as they are continuous fibers made of a ceramic material. Ceramic continuous fibers in the present invention can be, for example, one or more sorts of fibers selected from the group of SiC continuous fibers (silicon carbide continuous fibers), alumina continuous fibers and mullite continuous fibers, preferably are continuous fibers containing at least an aluminum (Al)-containing oxide, more preferably continuous fibers containing at least alumina. Preferably, furthermore, the ceramic continuous fibers are alumina continuous fibers or mullite continuous fibers or both, more preferably alumina continuous fibers or mullite continuous fibers. If higher heat resistance is needed, it is preferred that the ceramic continuous fibers according to the present invention be mullite continuous fibers. If greater strength is needed, however, it is preferred that the ceramic continuous fibers be alumina continuous fibers. The alumina continuous fibers are preferably continuous fibers formed by crystals of alumina. The mullite continuous fibers are preferably continuous fibers formed by crystals of mullite and may be fibers formed by crystals of mullite and alumina. The mullite fibers may contain alumina as a second phase therein.

In the present invention, ceramic continuous fibers may be a ceramic continuous fiber bundle, which is a bundle of ceramic continuous fibers, or ceramic fiber cloth made of ceramic continuous fibers according to the present invention. In the present invention, furthermore, ceramic continuous fibers may be ceramic fiber cloth obtained by knitting a ceramic continuous fiber bundle.

The metal-containing ceramic continuous fibers according to the present invention are ceramic continuous fibers having at least one metal element, that is, ceramic continuous fibers containing metal element(s) within the continuous fibers themselves.

The metal-containing ceramic continuous fibers according to the present invention contain at least one metal element, and it is preferred that the metal element be contained at least in crystal grain boundaries in the ceramic material forming the ceramic continuous fibers. The ceramic continuous fibers are formed by a polycrystalline ceramic material. By virtue of the presence of metal element(s) different from that (those) in the polycrystalline ceramic material in crystal grain boundaries, or between crystal grains of the polycrystalline ceramic material, the ceramic continuous fibers themselves are highly resistant to heat.

The metal element only needs to be contained at least in crystal grain boundaries in the polycrystalline ceramic material, and it is more preferred that the metal element be in the state of at least one of grain boundary diffusion or substitutional dissolution. This means that the metal element does not need to be contained as, for example, a coating layer (e.g., a coating layer of an inorganic acid salt) on the surface of the ceramic continuous fibers. Whether or not the metal-containing ceramic continuous fibers according to the present invention contain metal element(s) as a coating layer can be verified by examining a TEM or SEM image of the surface. That is, in a TEM or SEM image of a cross-section of a ceramic continuous fiber, any coating layer would be observed on the surface of the ceramic continuous fiber as a metal compound layer measuring a few to hundreds of nanometers. Therefore, if, in a cross-sectional SEM image of a metal-containing ceramic continuous fiber according to the present invention, no metal compound layer is observed on the surface of the ceramic continuous fiber, it means that no coating layer is contained.

The metal element that the metal-containing ceramic continuous fibers according to the present invention contain is metal element(s) different from that (those) in the ceramic fibers, or in the thread-shaped polycrystalline ceramic material. For example, in the case of alumina or mullite fibers, the metal element is one(s) that is not aluminum (Al). In the case of continuous fibers containing an oxide of aluminum, the metal element is one(s) that is not aluminum, preferably one(s) that is neither aluminum nor iron.

Preferably, the metal element contained in the metal-containing ceramic continuous fibers according to the present invention is one or more selected from the group consisting of alkali metals, alkaline earth metals, transition metals, zinc and gallium, more preferably at least one of an alkaline earth metal or a transition metal. It should be noted that in the present invention, silicon (Si) is not a metal element.

For alkali metals, an example can be at least one of sodium or potassium. For alkaline earth metals, an example can be one or more selected from the group consisting of magnesium, calcium, strontium and barium, and another can be at least one of magnesium or calcium. As for transition metals, an example can be one or more selected from the group consisting of lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper, another can be one or more selected from the group consisting of lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper, yet another can be one or more selected from the group consisting of lanthanum, ytterbium, lutetium, cerium, yttrium, zirconium, neodymium, titanium, scandium, vanadium, chromium, manganese, cobalt, nickel and copper, and another can be one or more selected from the group consisting of lanthanum, cerium, yttrium, zirconium, neodymium, titanium, scandium, vanadium, chromium, manganese, cobalt, nickel and copper.

It is preferred that the metal element be one(s) that is neither aluminum nor iron, because this makes more certain that the metal element produces its effects within the range of metal content levels that the metal-containing ceramic continuous fibers according to the present invention can have.

Preferably, the metal element that the metal-containing ceramic continuous fibers according to the present invention have is one or more selected from the group consisting of sodium, potassium, magnesium, calcium, strontium, barium, lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper, more preferably one or more selected from the group consisting of lanthanum, ytterbium, lutetium, magnesium, cerium, zirconium, neodymium, titanium, calcium, yttrium and strontium, even more preferably one or more selected from the group consisting of lanthanum, magnesium, cerium, zirconium, neodymium and titanium, still more preferably one or more selected from the group consisting of lanthanum, magnesium, cerium, zirconium, neodymium, titanium, calcium, yttrium and strontium, yet more preferably one or more selected from the group consisting of lanthanum, magnesium, cerium, zirconium, neodymium and titanium, in particular one or more selected from the group of lanthanum (La), magnesium (Mg) and zirconium (Zr). These metal elements are particularly likely to improve the heat resistance of continuous fibers made of an oxide containing aluminum. If the ceramic continuous fibers are alumina continuous fibers, it is preferred that they contain one or more selected from the group of lanthanum, magnesium, calcium, neodymium, zirconium, strontium and yttrium, more preferably at least one of magnesium or zirconium, as the metal element. If the ceramic continuous fibers are mullite continuous fibers, it is preferred that they contain one or more selected from the group of lanthanum, magnesium, cerium, zirconium, strontium and yttrium, more preferably at least one of lanthanum or magnesium, as the metal element.

The metal-containing ceramic continuous fibers according to the present invention comprise fibers (i.e., ceramic continuous fibers) and at least one metal element therein, with the concentration by mass of the metal element being 10 ppm or more and 1000 ppm or less. In other words, the ceramic continuous fibers according to the present invention are characterized in that the amounts of metal elements in them are 10 ppm or more and 1000 ppm or less as concentrations by mass. The concentrations by mass of metal elements in the metal-containing ceramic continuous fibers (hereinafter also referred to as "metal content (levels)," and if the metal element includes, for example, lanthanum, the concentrations are also referred to as, for example, "lanthanum content") are the amounts of the individual metal elements in the ceramic continuous fibers, and preferably, the metal-containing ceramic continuous fibers according to the present invention are characterized in that the amount of each metal element therein is 10 ppm or more and 1000 ppm or less. Preferably, the metal content levels of the metal-containing ceramic continuous fibers are 30 ppm or more and 900 ppm or less, more preferably 50 ppm or more and 800 ppm or less. If the metal content levels are concentrations lower than 10 ppm, the advantage of improved heat resistance is not achieved; the heat resistance is only comparable to that of ceramic continuous fibers containing no metal element. If the metal content levels exceed 1000 ppm, the structure of the ceramic continuous fibers themselves changes significantly (i.e., the strength of the ceramic continuous fibers themselves as a base material decreases). This causes the overall strength of the metal-containing ceramic continuous fibers to deteriorate (decrease).

For individual metal content levels, furthermore, an example is that the lanthanum content is 50 ppm or more or 70 ppm or more and 900 ppm or less or 800 ppm or less, the magnesium content is 10 ppm or more or 20 ppm or more and 900 ppm or less or 800 ppm or less, or the zirconium content is 10 ppm or more or 20 ppm or more and 900 ppm or less or 800 ppm or less.

More preferably, the metal-containing ceramic continuous fibers according to the present invention are metal-containing ceramic continuous fibers that contain one or more metal elements selected from the group consisting of sodium, potassium, magnesium, calcium, strontium, barium, lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper and meet at least one of (a) or (b) below.

(a) The calcium content is more than 20 ppm and 1000 ppm or less, the magnesium content is more than 25 ppm and 1000 ppm or less, or the zirconium content is 15 ppm or more and 1000 ppm or less;

(b) The amount of any of the above metal elements excluding calcium, magnesium and zirconium is 10 ppm or more and 1000 ppm or less.

Even more preferably, the metal-containing ceramic continuous fibers according to the present invention are metal-containing ceramic continuous fibers that contain one or more metal elements selected from the group consisting of magnesium, calcium, strontium, lanthanum, ytterbium, lutetium, cerium, yttrium, zirconium and neodymium and meet at least one of (a) or (b) below.

(a) The calcium content is more than 20 ppm and 1000 ppm or less, the magnesium content is more than 25 ppm and 1000 ppm or less, or the zirconium content is 15 ppm or more and 1000 ppm or less;

(b) The amount of any of the above metal elements excluding calcium, magnesium and zirconium is 10 ppm or more and 1000 ppm or less.

Preferably, furthermore, the total amount of the metal elements of sodium, potassium, magnesium, calcium, strontium, barium, lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper, preferably that of the metal elements of magnesium, calcium, strontium, lanthanum, ytterbium, lutetium, cerium, yttrium, zirconium and neodymium, in the metal-containing ceramic continuous fibers according to the present invention is 10 ppm or more or 30 ppm or more and 1000 ppm or less, 200 ppm or less or 120 ppm or less.

More preferably, the metal-containing ceramic continuous fibers according to the present invention are metal-containing ceramic continuous fibers that contain one or more metal elements selected from the group consisting of magnesium, calcium, strontium, lanthanum, ytterbium, lutetium, cerium, yttrium, zirconium and neodymium and meet at least one of (a) or (b) below.

(a) The calcium content is more than 20 ppm and 1000 ppm or less, the magnesium content is more than 25 ppm and 1000 ppm or less, or the zirconium content is 15 ppm or more and 1000 ppm or less;

(b) The amount of any of the above metal elements excluding calcium, magnesium and zirconium is 10 ppm or more and 1000 ppm or less each.

The metal content levels can be determined by ICP emission spectrometry. A concentration by mass is the mass of a metal element per unit mass of the ceramic continuous fibers. For example, if 100 μg of the element lanthanum (La) is contained in 1 g of alumina fibers, it means a concentration by mass of 100 ppm (ppm by mass), and the concentration is determined according to the following equation.

$$\text{Metal content [ppm]} = \text{Mass of the metal element [g]}/\text{Mass of the ceramic continuous fibers [g]} = \text{Mass of lanthanum (La)}/\text{Mass of the alumina fibers} = 100 \text{ [μg]}/1 \text{ [g]} = 100 \text{ [ppm]}$$

In the present invention, the ICP emission spectrometry can be performed using a common ICP emission spectrometer (e.g., Vista-PRO axial, Seiko Instruments). The measurement conditions for ICP emission spectrometry can be, for example, as follows.

Frequency: 40 MHz

Power: 1.0 kW

Detector: A CCD detector

Sample introduction: A cyclonic nebulizer

The sample for the ICP emission spectrometry can be ceramic continuous fibers decomposed with sulfuric acid under applied pressure at 230° C. for 144 hours.

It should be noted that ceramic continuous fibers used as a raw material for the metal-containing ceramic continuous fibers according to the present invention (hereinafter also referred to as "source fibers") themselves can contain inevitable impurities. In that case, the metal content levels are concentrations by mass of metal elements including the inevitable impurities in the source fibers.

The concentrations by mass of metal elements excluding the inevitable impurities contained in the source fibers (hereinafter also referred to as "dopant metal content (levels)"), by contrast, are the amounts of metal elements in the metal-containing ceramic continuous fibers according to the present invention excluding those originating in the source fibers, or the concentrations by mass of what is called dopant metal elements. Dopant metal elements are metal elements that the ceramic continuous fibers contain after spinning, and a dopant metal content level is determined according to the following equation.

$$\text{Concentration by mass (dopant metal content) [ppm]} = \text{Concentration of the metal element in the metal-containing ceramic continuous fibers according to the present invention [ppm]} - \text{Concentration of the Metal Element in the Source Fibers [ppm]}$$

In this equation, the "concentration of the metal element in the metal-containing ceramic continuous fibers according to the present invention" is the concentration of the metal element obtained by analyzing the metal-containing ceramic continuous fibers, preferably metal-containing ceramic continuous fibers that have not been subjected to heat treatment at 1000° C. or above, by ICP emission spectrometry and is a metal content level as defined above. The "concentration of the metal element in the source fibers" is the concentration of the metal element obtained by analyzing, by ICP emission spectrometry, the source fibers used as a raw material in making the metal-containing ceramic continuous fibers according to the present invention. The metal elements and their amounts in the source fibers vary greatly according to the type, production lot, etc., of the source fibers. For example, for mullite continuous fibers (trade name, Nextel 720; 3M) and alumina continuous fibers (trade name, Nextel 610; 3M), an example of a major inevitable impurity is iron.

Preferably, the dopant metal content levels of the metal-containing ceramic continuous fibers according to the present invention are 1 ppm or more and 1000 ppm or less, more preferably 3 ppm or more and 1000 ppm or less, in particular 5 ppm or more and 1000 ppm or less. An example can be that the lanthanum content as a dopant metal content (hereinafter, if the dopant metal elements include, for example, lanthanum, the amounts of the dopant metals are also referred to as, for example, "dopant lanthanum content"), the dopant neodymium content, the dopant lutetium content, the dopant strontium content and the dopant yttrium content are 10 ppm or more or 50 ppm or more and 300 ppm or less or 150 ppm or less each, the dopant magnesium content is 5 ppm or more or 10 ppm or more and 50 ppm or less or 25 ppm or less, the dopant calcium content is 5 ppm or more or 10 ppm or more and 50 ppm or less or 30 ppm or less, and the dopant ytterbium content and the dopant zirconium content are 10 ppm or more or 50 ppm or more and 250 ppm or less, 200 ppm or less or 100 ppm or less each.

The size of the crystallites of the fiber-forming substance, or the polycrystalline ceramic material, in the ceramic continuous fibers (metal-containing ceramic continuous fibers) according to the present invention depends on the ceramic material used, and the fiber-forming substance can have any crystallite size. To take the example of alumina continuous fibers, the size of alumina crystallites therein can be, for example, 60 nm or more or 70 nm or more and 100 nm or less or 90 nm or less. As for alumina-containing mullite fibers, the size of alumina crystallites therein can be, for example, 20 nm or more or 30 nm or more and 60 nm or less or 50 nm or less.

The crystallite size can be determined from an XRD pattern of the ceramic continuous fibers using the Scherrer equation, below.

$$D = K \times \lambda/((\beta - B) \times \cos \theta)$$

In this equation, D is the average crystallite size (nm), K is the Scherrer constant (1.0), λ is the wavelength of CuKα (0.15418 nm), β is the integral breadth (rad), B is the instrumental constant (rad), and C is the measured angle of diffraction. The instrumental constant is a constant used to correct for instrument-related broadening of the x-rays and can be determined by a method known to those skilled in the art using silicon as the standard sample. The integral breadth, furthermore, is determined using Rigaku's Integral Analysis for Windows (version 6.0), and the analytical function can be a split Voigt function. If the size of alumina crystallites is determined, the angle of diffraction can be that for the peak corresponding to the (300) plane of a hexagonal phase of alumina, which has its maximum around $2\theta = 68°$ ($2\theta = 68 \pm 0.2°$), for alumina-containing mullite continuous fibers or that for the peak corresponding to the (104) plane of a hexagonal phase of alumina, which has its maximum around $2\theta = 35°$ ($2\theta = 35 \pm 0.2°$), for alumina continuous fibers. If the size of mullite crystallites is determined, the angle of diffraction can be that for the peak having its maximum around $2\theta = 33.1°$ ($2\theta = 33.1 \pm 0.2°$) for mullite continuous fibers. An example of an instrumental constant is 0.003002 (rad) for mullite continuous fibers for example, and is 0.002723 (rad) for alumina continuous fibers.

The XRD pattern can be obtained by XRD using a common powder x-ray diffractometer (e.g., Ultima III, Rigaku) under the following conditions.

X-ray source: CuKα radiation (λ=0.15418 nm)

Measurement mode: Step scans

Scan condition: 0.04° per second

Divergence slit: ⅔ deg

Scattering slit: ⅔ deg

Receiving slit: 0.3 mm

Measurement time: 2.0 seconds

Measurement range: 2θ=20° to 80°

Inside the metal-containing ceramic continuous fibers according to the present invention, the growth of crystallites of the fiber-forming substance (polycrystalline ceramic material) after prolonged heat treatment at high temperatures is limited by virtue of the presence of the metal element(s). As a result, the metal-containing ceramic continuous fibers according to the present invention remain made up of fine structures (small crystallite sizes) even after prolonged heat treatment; the fibers are highly resistant to heat.

Crystallites tend to grow larger with increasing thermal load. Although the degree of thermal load-induced growth of crystallites in ceramic continuous fibers varies according to the type of the ceramic material forming the fibers, furthermore, the metal-containing ceramic continuous fibers according to the present invention achieve, for example, a percentage growth of crystallites after heat treatment (hereinafter also referred to as "crystallite growth") of 160% or less. Since the crystallites become larger through the heat treatment, the crystallite growth is, for example, 0% or more or exceeds 0%.

The percentage growth of crystallites after heat treatment can be calculated according to equation (1) below.

$$G=\{(d_b-d_a)/d_a\}\times100 \qquad (1)$$

G is the percentage growth (%) of crystallites, $d_a$ is the size (nm) of crystallites of the fiber-forming substance in the ceramic continuous fibers before the heat treatment, and $d_b$ is the size (nm) of crystallites of the fiber-forming substance in the ceramic continuous fibers after the heat treatment.

The heating conditions for the ceramic continuous fibers in the measurement of the crystallite growth can be, for example, as follows.

Heating atmosphere: Air atmosphere

Heating temperature: 1300° C.

Heating time: 100 hours

If the ceramic continuous fibers are alumina continuous fibers, it is preferred that the crystallite growth of alumina crystallites be 160% or less, more preferably 120% or less or 100% or less and 0% or more, 20% or more, 40% or more or 60% or more.

If the ceramic continuous fibers are alumina-containing mullite continuous fibers, it is preferred that the crystallite growth of alumina crystallites be 75% or less, 60% or less, 50% or less or 35% or less and 0% or more, 5% or more or 15% or more. If the ceramic continuous fibers are mullite continuous fibers, furthermore, it is preferred that the percentage growth of crystallites after heat treatment in an air atmosphere (i.e., in the air) at 1200° C. for 100 hours be 17% or less, more preferably 3% or more and 17% or less.

The heat resistance of ceramic continuous fibers can be evaluated through the measurement of monofilament tensile strength. Specifically, it can be evaluated by measuring the tensile strength of the ceramic continuous fibers after heat treatment as specified below (hereinafter also referred to as "monofilament tensile strength") by a method equivalent to method B of JIS R 1657. The measurement conditions for monofilament tensile strength are as follows.

Gauge length: 25 mm

Test rate: 0.5 mm/min

The heating conditions for the ceramic continuous fibers subjected to the measurement of monofilament tensile strength can be, for example, as follows.

Heating atmosphere: Air atmosphere

Heating temperature: 1300° C.

Heating time: 100 hours

Preferably, the ceramic continuous fibers according to the present invention have a monofilament tensile strength of higher than 1.0 GPa, 1.1 GPa or more or 1.2 GPa or more after the above heat treatment. This makes more certain that CMCs made with the fibers will have high strength even after being exposed to high temperatures. The monofilament tensile strength after the above heat treatment can be, for example, 1.7 GPa or less or 1.5 GPa or less.

For the ceramic continuous fibers according to the present invention, the difference between their monofilament tensile strengths before and after heat treatment can be, for example, 0.5 GPa or less or 0.4 GPa or less and 0 GPa or more or 0.1 GPa or more. It should be noted that the difference between the monofilament tensile strengths before and after heat treatment somewhat varies according to the type of the ceramic continuous fibers. For example, the difference between the monofilament tensile strengths before and after heat treatment of mullite continuous fibers tends to be small compared with that of alumina continuous fibers.

The metal element-having ceramic continuous fibers according to the present invention are suitable for use as a CMC. The metal element-having ceramic continuous fibers according to the present invention are highly resistant to heat compared with known ceramic continuous fibers. When they are used as a CMC as a composite with a ceramic matrix, the CMC exhibits high heat resistance.

An example of preferred metal-containing ceramic continuous fibers according to the present invention is metal-containing ceramic continuous fibers containing one or more metal elements selected from the group of lanthanum, ytterbium, lutetium, magnesium, cerium, strontium, yttrium, neodymium, titanium, zirconium, calcium, scandium, vanadium, chromium, manganese, cobalt, nickel and copper and in which the amount of each of the metal element(s) is 10 ppm or more, 30 ppm or more or 50 ppm or more and 1000 ppm or less, 500 ppm or less, 250 ppm or less or 120 ppm or less.

Another example of preferred metal-containing ceramic continuous fibers according to the present invention is metal-containing ceramic continuous fibers containing one or more metal elements selected from the group of lanthanum, ytterbium, lutetium, magnesium, cerium, strontium, yttrium, neodymium, titanium, zirconium, calcium, scandium, vanadium, chromium, manganese, cobalt, nickel and copper as dopant metal element(s) and in which the amount of each of the metal element(s) is 10 ppm or more, 30 ppm or more or 50 ppm or more and 1000 ppm or less, 500 ppm or less, 250 ppm or less or 120 ppm or less.

[Ceramic Matrix Composite Material (CMC)]

A ceramic matrix composite material according to an embodiment of the present invention (hereinafter also referred to as "a CMC according to the present invention") is a ceramic matrix composite material, i.e., a composite of ceramic continuous fibers and at least one ceramic matrix, composed of the above metal element-having ceramic continuous fibers (metal-containing ceramic continuous fibers) and at least one ceramic matrix. That is, a CMC according to this embodiment is a ceramic matrix composite material composed of the above metal-containing ceramic continuous fibers and at least one ceramic matrix, and is also a ceramic fiber-reinforced ceramic material based on ceramic matrix(s) with the above metal-containing ceramic continuous fibers therein.

The ceramic matrix forming the CMC according to the present invention is at least one of an oxide ceramic material or a non-oxide ceramic material, preferably oxide ceramic material(s), more preferably at least one selected from the group of alumina, mullite, zirconia and silica, even more preferably one or more selected from the group of alumina, mullite and silica, preferably at least one of alumina or mullite. For strength reasons, it is preferred that the ceramic matrix be alumina. For heat resistance reasons, it is preferred that the ceramic matrix be mullite. Preferably, the ceramic matrix and the ceramic continuous fibers are made of the same material(s). For example, the CMC according to this embodiment is preferably a CMC formed by alumina continuous fibers and an alumina matrix, a CMC formed by mullite continuous fibers and a mullite matrix or a CMC formed by silicon carbide continuous fibers and a silicon carbide matrix. Alternatively, in the CMC according to this embodiment, the major constituents of the ceramic matrix may be different from those of the ceramic continuous fibers.

The density of the CMC according to this embodiment varies, for example, according to the ceramic matrix(ices) used. It can be, however, $2.50 \text{ g/cm}^3$ or more or $2.70 \text{ g/cm}^3$ or more and $3.20 \text{ g/cm}^3$ or less or $3.00 \text{ g/cm}^3$ or less, for example.

The fiber content by volume of the CMC according to the present invention can be, for example, 10% or more or 20% or more and 45% or less or 40% or less.

The "fiber content by volume" is the percentage by volume [vol %] of ceramic continuous fibers in a CMC. The fiber content by volume can be determined according to the following equation.

$$\text{Fiber content by volume } [\%] = (V_f / V_{CMC})100$$

In this equation, $V_f$ is the volume of the ceramic continuous fibers, and $V_{CMC}$ is the volume of the CMC. $V_f$ and $V_{CMC}$ can be determined from the following equations, respectively.

$$V_f = m / \rho_f$$

$$V_{cmc} = A \times B \times t$$

In these equations, m is the mass [g] of the ceramic continuous fibers, and $\rho_f$ is the density $[\text{g/cm}^3]$ of the ceramic continuous fibers. A is the length [mm] of the CMC, B is the width [mm] of the CMC, and t is the thickness [mm] of the CMC.

The heat resistance of a CMC can be evaluated by a tensile test. Specifically, the heat resistance can be evaluated by measuring the tensile strength of a heated CMC by a method according to JIS R 1656 and determining the change. The measurement conditions for the tensile strength (hereinafter also referred to as "bulk tensile strength") of the CMC are as follows.

Testing rate: 0.5 mm/min

The test piece for the bulk tensile strength measurement only needs to be a sheet of the CMC 10 mm wide×110 mm long×2.5 mm thick. The heating conditions for the CMC subjected to the bulk tensile strength measurement can be, for example, as follows.

Heating atmosphere: Air atmosphere

Heating temperature: 1300° C.

Heating time: 100 hours

Preferably, the CMC according to this embodiment has a bulk tensile strength of 70 MPa or more or 100 MPa or more after the above heat treatment. The bulk tensile strength after heat treatment varies according to the ceramic continuous fibers constituting the metal-containing ceramic continuous fibers. For example, for metal-containing alumina continuous fibers, the bulk tensile strength after heat treatment can be, for example, 135 MPa or more or even 150 MPa or more and can be, for example, 280 MPa or less, 250 MPa or less or 225 MPa or less. As for metal-containing, especially alumina-containing, mullite continuous fibers, the bulk tensile strength after heat treatment can be, for example, 60 MPa or more or even 70 MPa or more and can be, for example, 200 MPa or less or 160 MPa or less.

Preferably, the difference between the bulk tensile strengths before and after heat treatment (bulk tensile strength before heat treatment–bulk tensile strength after heat treatment) is small. For example, however, this difference can be 100 MPa or less or 80 MPa or less, or even 50 MPa or less.

[Method for Producing Ceramic Continuous Fibers Having a Metal Element]

A method according to the present invention for producing ceramic continuous fibers having a metal element will now be described.

An example of a method according to the present invention for producing metal-containing ceramic continuous fibers is one comprising an immersion step in which ceramic continuous fibers are immersed in a solution containing at least one metal acetylacetonate complex and a heat treatment step in which the ceramic continuous fibers are heated at 950° C. or above and 1300° C. or below. Preferably, the production method is one including an immersion step in which ceramic continuous fibers are immersed in a solution containing metal acetylacetonate complex(es) to give a precursor and a heat treatment step in which the precursor is heated at 950° C. or above and 1300° C. or below.

The ceramic continuous fibers subjected to the immersion step (source fibers) can be of any type, as long as they are continuous fibers made of ceramic material(s). Examples include SiC continuous fibers, alumina continuous fibers, and mullite continuous fibers, and preferably the source fibers are alumina continuous fibers or mullite continuous fibers or both, more preferably alumina continuous fibers or mullite continuous fibers. If higher heat resistance is required, it is preferred that the source fibers be mullite continuous fibers. If greater strength is required, however, it is preferred that the source fibers be alumina continuous fibers. The alumina continuous fibers are preferably continuous fibers formed by alumina crystals. The mullite continuous fibers are preferably continuous fibers formed by mullite crystals or fibers formed by mullite and alumina crystals. The mullite fibers may contain alumina as a second phase therein. In the present invention, it is preferred that the immersion step be performed on ceramic continuous fibers having exposed hydroxyl groups on their surface, or, in other words, that the ceramic continuous fibers subjected to the immersion step be ones having hydroxyl groups on their surface.

Preferably, the ceramic continuous fibers used in the method according to the present invention for producing metal-containing ceramic continuous fibers are a ceramic fiber bundle, which is a bundle of fibers, or a ceramic fiber cloth. The ceramic fiber cloth may be a commercially available one. Examples of commercially available ceramic fiber cloths include Hi-Nicalon (Nippon Carbon) and Tyranno Fiber (Ube Industries) for ceramic fiber cloths made of SiC fibers (SiC fiber cloths), Nextel 610 (3M) for ceramic fiber cloths made of alumina fibers (alumina fiber cloths), and Nextel 720 (3M) for ceramic fiber cloths made of mullite fibers (mullite fiber cloths).

In the immersion step, the source fibers are immersed in a solution containing at least one metal acetylacetonate complex (hereinafter also referred to as "metal-AcAc complex"). This causes the metal-AcAc complex to be adsorbed on the surface of the ceramic continuous fibers, yielding metal-AcAc complex-adsorbed ceramic continuous fibers as a precursor.

The metal-AcAc complex used for immersion can be, for example, acetylacetonate complex(es) containing one or more selected from the group of lanthanum, ytterbium, lutetium, magnesium, zirconium, cerium, yttrium, titanium, sodium, potassium, calcium, scandium, vanadium, chromium, manganese, cobalt, nickel, copper, zinc, gallium and strontium, preferably AcAc complex(es) containing one or more selected from the group of lanthanum, magnesium, cerium, yttrium, calcium and scandium, more preferably AcAc complex(es) containing one or more selected from the group of lanthanum, magnesium and zirconium. Specifically, the metal-AcAc complex can be, for example, at least one of lanthanum(III) acetylacetonate dihydrate (La $(CH_3COCHCOCH_3)_3 \cdot 2H_2O$), ytterbium(III) acetylacetonate hydrates (Yb($CH_3COCHCOCH_3)_3 \cdot nH_2O$), lutetium acetylacetonate hydrates (Lu($CH_3COCHCOCH_3)_3 \cdot nH_2O$), magnesium(II) acetylacetonate hydrates (Mg $(CH_3COCHCOCH_3)_2 \cdot nH_2O$), zirconium(IV) acetylacetonate (Zr $(CH_3COCHCOCH_3)_4$), cerium(III) acetylacetonate trihydrate (Ce $(CH_3COCHCOCH_3)_3 \cdot 3H_2O$), yttrium(III) acetylacetonate n-hydrates (Y($CH_3COCHCOCH_3)_3 \cdot nH_2O$), titanium(IV) acetylacetonate (Ti($CH_3COCHCOCH_3)_4$), sodium(I) acetylacetonate hydrates (Na($CH_3COCHCOCH_3$) $nH_2O$), potassium acetylacetonate 0.5-hydrate (K($CH_3COCHCOCH_3) \cdot 0.5H_2O$), calcium(II) acetylacetonate hydrates (Ca($CH_3COCHCOCH_3)_2 \cdot nH_2O$), scandium(III) acetylacetonate hydrates (Sc($CH_3COCHCOCH_3)_3 \cdot nH_2O$), vanadium(III) acetylacetonate (V($CH_3COCHCOCH_3)_3$), chromium(III) acetylacetonate (Cr($CH_3COCHCOCH_3)_3$), manganese (III) acetylacetonate (Mn($CH_3COCHCOCH_3)_3$), cobalt(II) acetylacetonate hydrates (Co($CH_3COCHCOCH_3)_2 \cdot nH_2O$), nickel(II) acetylacetonate hydrates (Ni $(CH_3COCHCOCH_3)_2 \cdot nH_2O$), copper(II) acetylacetonate (Cu($CH_3COCHCOCH_3)_2$), zinc(II) acetylacetonate hydrates (Zn($CH_3COCHCOCH_3)_2 \cdot nH_2O$), gallium(III) acetylacetonate (Ga($CH_3COCHCOCH_3)_3$) and strontium(II) acetylacetonate hydrates (Sr($CH_3COCHCOCH_3)_2 \cdot nH_2O$). Preferably, the metal acetylacetonate(s) is at least one selected from the group of lanthanum(III) acetylacetonate dihydrate, ytterbium acetylacetonate hydrates, lutetium acetylacetonate hydrates, magnesium(II) acetylacetonate hydrates, zirconium(IV) acetylacetonate, cerium(III) acetylacetonate trihydrate, yttrium(III) acetylacetonate n-hydrates, titanium(IV) acetylacetonate, calcium(II) acetylacetonate hydrates (Ca($CH_3COCHCOCH_3)_2 \cdot nH_2O$) and strontium(II) acetylacetonate hydrates, more preferably at least one selected from the group of lanthanum(III) acetylacetonate dihydrate, magnesium(II) acetylacetonate hydrates and zirconium(IV) acetylacetonate.

The solvent(s) in the solution containing at least one metal-AcAc complex (hereinafter also referred to as "metal-AcAc solution") can be of any type, as long as the metal-AcAc complex dissolves therein without being decomposed. Examples of preferred solvents include alcohols, such as methanol, ethanol and propanol, organic solvents, such as acetone and benzene, water and deuterium oxide. Preferably, the solvent(s) is at least one of water or an alcohol, more preferably at least one of methanol or ethanol.

The metal-AcAc solution only needs to contain metal-AcAc complex(es) and solvent(s) and can be any solution formed by metal-AcAc complex(es) and solvent(s).

The immersion can be carried out under any conditions under which the chemical adsorption of the metal-AcAc complex onto the ceramic continuous fibers proceeds. The impregnation temperature can be, for example, the boiling point of the solvent(s) or lower, preferably room temperature ($25 \pm 3°$ C.), and the impregnation time can be, for example, 30 minutes or more and 24 hours or less, preferably 1 hour or more and 5 hours or less. Preferably, the solution is heated at a temperature equal to or lower than the boiling point of the solvent during the impregnation process as this promotes the acceleration of the chemical adsorption.

In the heat treatment step, the precursor, or the immersed ceramic continuous fibers (metal-AcAc complex-adsorbed ceramic continuous fibers), is heated at 950° C. or above and 1300° C. or below. The heat treatment causes the organic component of the metal-AcAc complex to decompose and the metal element to thermally diffuse uniformly into the ceramic continuous fibers. The heating temperature is 950° C. or above and 1300° C. or below. This allows oxide(s) of the metal to form a uniform coating on the surface of the fibers and, at the same time, the resulting coating of the metal element to thermally diffuse between the crystal grains of the polycrystalline ceramic material forming the fibers, in the course of the heat treatment. At temperatures lower than 950° C., the metal element in the metal-AcAc complex is not diffused well; it tends to remain on the surface of the fibers. At temperatures exceeding 1300° C., the ceramic continuous fibers are thermally degraded. Preferably, the heating temperature is 1000° C. or above and 1300° C. or below, more preferably 1050° C. or above and 1250° C. or below, even more preferably 1100° C. or above and 1200° C. or below, in particular 1100° C. or above and 1175° C. or below. The heating time can be changed as needed according to the size of the ceramic continuous fibers and the firing furnace used, but an example can be 1 hour or more and 5 hours or less. The heating atmosphere may be any atmosphere, but an example is an oxidizing atmosphere, preferably an air atmosphere.

The inventors believe that heating the ceramic continuous fibers alone, or heating the ceramic continuous fibers in the absence of the ceramic matrix or other substance that would form a composite therewith, allows the metal element on the surface of the fibers to diffuse into the fibers without dissolving in or being absorbed by the ceramic matrix.

In the present invention, furthermore, the ceramic continuous fibers after the immersion step may be pretreated before the heating (i.e., prior to the heat treatment step) by heating at 500° C. or above and below 950° C., preferably 700° C. or above and below 950° C.° C. The pretreatment time can be changed as needed according to the size of the ceramic continuous fibers and the firing furnace used, but an example can be 1 hour or more and 5 hours or less. The heating atmosphere may be any atmosphere, but an example is an oxidizing atmosphere, preferably an air atmosphere.

In the production method according to the present invention, the immersion and heat treatment steps may be repeated twice or more, twice or more and ten times or less or even three times or more and eight times or less. The metal content can be controlled by changing the number of immersion and heat treatment steps, and the metal content of the ceramic continuous fibers (metal-containing ceramic continuous fibers) according to the present invention tends to increase with increasing number of repetitions of these steps. Preferably, the number of repetitions is one or more and ten or less. Repeating these steps more than ten times causes the heat treatment to decrease the strength of the fibers.

[Method for Producing a Ceramic Matrix Composite Material (CMC)]

A method according to this embodiment for producing a CMC can be any method that suits the purpose of obtaining a CMC containing metal-containing ceramic continuous fibers according to this embodiment. A method according to an embodiment for producing a ceramic matrix composite material can be, for example, a production method comprising a combining step in which metal element-having ceramic continuous fibers (metal-containing ceramic continuous fibers) as described above and at least one ceramic matrix are combined into a composite.

The fibers and the matrix may be combined into a composite by any method, but examples of preferred methods include a method including impregnating the ceramic continuous fibers (metal-containing ceramic continuous fibers) with a slurry containing raw material(s) for the ceramic matrix (hereinafter also referred to as "source slurry") and then heating the ceramic continuous fibers, and a method including impregnating the metal-containing ceramic continuous fibers with a source slurry, impregnating the ceramic continuous fibers with a precursor and heating the ceramic continuous fibers. Another example is a method for producing a CMC that includes a shaping step in which a mixture of a source slurry and coated ceramic continuous fibers according to this embodiment is shaped to give a green body, and a firing step in which the green body is fired.

The source slurry contains raw material(s) for the ceramic matrix and preferably is a dispersion of ceramic powder(s) in a solvent. An example is a slurry that contains, as the ceramic powder(s), at least one selected from the group of alumina, mullite, silica and zirconia, preferably at least one of alumina or mullite, more preferably at least one of alumina or mullite, even more preferably alumina.

The solvent in the source slurry can be any solvent in which ceramic powders are dispersed. Examples include water and alcohols, and preferably the solvent is water.

A dispersant, for example, may be used to disperse the ceramic powder(s) in the solvent.

The source slurry and the metal-containing ceramic continuous fibers according to this embodiment may be mixed together by any method, and an example is to impregnate the metal-containing ceramic continuous fibers according to this embodiment with the source slurry. The impregnation conditions may be any conditions, provided that the metal-containing ceramic continuous fibers are completely immersed in the source slurry.

After the source slurry and the metal-containing ceramic continuous fibers according to this embodiment are mixed together, the resulting mixture is shaped. The shaping can be done by any method that gives the mixture a definite shape, and an example is by heating the mixture in the air in the air at a temperature of 25° C. to 160° C., preferably 80° C. to 140° C. This gives a green body.

Firing the resulting green body yields a CMC according to this embodiment. The firing conditions can be, for example, firing the green body in an oxidizing atmosphere, preferably an air atmosphere, at 1050° C. to 1300° C. or 1050° C. to 1200° C.

The method according to this embodiment for producing a CMC may include, prior to the firing, a calcination step in which the green body is calcined to give a calcined body and a heat treatment step in which the calcined body is immersed in at least one precursor and then heated.

In the calcination step, the green body is calcined to give a calcined body. The calcination conditions only need to be such that the sintering of the ceramic matrix will proceed. An example is 600° C. to 1000° C., preferably 800° C. to 1000° C., in the air.

The heat treatment step makes the resulting CMC denser. In the heat treatment step, the calcined body is immersed in at least one precursor and then heated. The precursor can be any compound(s) that densifies the ceramic matrix through heat treatment and precursor(s) to the ceramic matrix. Alumina precursor(s), for example, can be one or more selected from the group of polyaluminum chloride, aluminum hydroxide and aluminum nitrate or can be polyaluminum chloride.

As for immersion, it is preferred to immerse a solution containing the precursor, preferably an aqueous solution containing the precursor, and the calcined body together. The immersion conditions only need to be such that the aqueous solution will spread into pores in the calcined body. For example, the immersion conditions can be 1 minute or more and 1 hour or less at room temperature in a reduced-pressure atmosphere, preferably a vacuum atmosphere, more preferably a vacuum atmosphere of –0.08 MPaG or less.

The calcined body immersed in the precursor is heated. The heating conditions may be any conditions, but an example can be 600° C. to 1000° C., preferably 800° C. to 1000° C., in an oxidizing atmosphere, preferably an air atmosphere. The heating time may be any length of time, but an example can be 30 minutes or more and 5 hours or less.

The heat treatment step may be repeated; the heat treatment step may be performed one to ten times or one to five times.

If the method according to this embodiment for producing a CMC includes calcination and heat treatment steps, the calcined body after the heat treatment step may be fired instead of the green body.

A specific example of a preferred method according to the present invention for producing a CMC is, if the ceramic matrix is, for example, at least one of alumina or mullite, to impregnate the metal-containing ceramic continuous fibers with a source slurry containing ceramic powder(s) of at least one of alumina or mullite, then heat the ceramic continuous fibers at 600° C. or above and 1000° C. or below in the air to obtain a calcined body, and sinter the calcined body at 1050° C. or above and 1300° C. or below to combine the materials into a composite.

According to the present invention, there can be provided metal element-having ceramic continuous fibers suitable for use in the production of CMCs having high strength and a CMC made therewith.

EXAMPLES

The present invention will now be described with reference to examples. The present invention, however, is not limited to these examples.

(ICP Emission Spectrometry)

Fibers were quantitatively analyzed for metal elements therein using an ICP emission spectrometer (model, Vista-PRO axial; Seiko Instruments) under the following conditions.

Frequency: 40 MHz

Power: 1.0 kW

Detector: A CCD detector

Sample introduction: A cyclonic nebulizer

To obtain the sample for measurement, 0.1 g of ceramic continuous fibers was decomposed with sulfuric acid under applied pressure at 230° C. for 144 hours, and the resulting solution was concentrated, made up to a predetermined volume and then diluted.

(Monofilament Tensile Strength)

The monofilament tensile strength was measured by a method equivalent to method B of JIS R 1657. The measurement conditions for monofilament tensile strength were as follows.

Gauge length: 25 mm

Test rate: 0.5 mm/min (Bulk Tensile Strength)

The bulk tensile strength was measured by the following method according to JIS R 1656. Specifically, a sample CMC was machined to approximately 10 mm wide×approximately 110 mm long×approximately 2.5 mm thick, and an aluminum tab was attached to both ends of the cut piece for use as a tensile test piece. The width and thickness of the tensile test piece were measured with a micrometer, and the length of the test piece was measured with a caliper. Using a strength tester (model, AG-XPlus; Shimadzu) and a tensile test fixture, a tensile strength test was performed at a loading rate of 0.5 mm/min by a method according to JIS R 1656.

(XRD)

The XRD was performed using a common powder x-ray diffractometer (model, Ultima III; Rigaku). The XRD conditions were as follows.

X-ray source: CuKα radiation (λ=0.15418 nm)

Measurement mode: Step scans

Scan condition: 0.04° per second

Divergence slit: $\frac{2}{3}$ deg

Scattering slit: $\frac{2}{3}$ deg

Receiving slit: 0.3 mm

Measurement time: 2.0 seconds

Measurement range: 2θ=20° to 80°

(Crystallite Size)

The crystallite size of the elements constituting the ceramic continuous fibers was determined from an XRD pattern obtained in the same way as in (XRD) using the Scherrer equation, below.

$$D=K×λ/((β-B)×\cos θ)$$

In this equation, D is the average crystallite size (nm), K is the Scherrer constant (1.0), z is the wavelength of CuKα (0.15418 nm), β is the integral breadth (rad), B is the instrumental constant (rad), and θ is the measured angle of diffraction. The instrumental constant was set to 0.003002 (rad) if the source fibers were mullite continuous fibers or 0.002723 (rad) if the source fibers were alumina continuous fibers. The integral breadth was determined using Rigaku's Integral Analysis for Windows (version 6.0), with the analytical function being a split Voigt function. The angle of diffraction was that for the peak corresponding to the (300) plane of a hexagonal phase of alumina, which has its maximum around 2θ=68° (2θ=68±0.2°), for mullite continuous fibers or that for the peak corresponding to the (104)

plane of a hexagonal phase of alumina, which has its maximum around 2θ=35° (2θ=35±0.2°), for alumina continuous fibers.

Example A1

0.4 g of lanthanum(III) acetylacetonate dihydrate (La (CH$_3$COCHCOCH$_3$)$_3$·2H$_2$O; hereinafter also referred to as "La—AcAc complex") was dissolved in 200 mL of ethanol, and a mullite fiber cloth (model, Nextel 720; 3M) heated in the air at 800° C. (desized) was impregnated with the resulting lanthanum-AcAc solution for 24 hours at room temperature.

After impregnation, the immersed mullite fiber cloth was heated in the air at 900° C. for 2 hours, yielding a lanthanum oxide-coated mullite fiber cloth (lanthanum oxide-coated mullite continuous fibers).

Surface STEM-EDS images of the resulting lanthanum oxide-coated mullite continuous fibers are presented in FIGS. 1 (a) to (f). An approximately 10-nm thick coating layer was observed on the fiber surface. Elemental analysis revealed the coating layer was composed of La and 0, indicating it was a layer of lanthanum oxide.

Then the lanthanum oxide-coated mullite fiber cloth was heated in the air at 1100° C. for 2 hours. In this way, the lanthanum-containing ceramic fiber cloth (lanthanum-containing ceramic continuous fibers) of this example was obtained.

Surface STEM-EDS images of the resulting lanthanum-containing mullite fiber cloth are presented in FIGS. 2 (a) to (f). As can be seen from FIG. 2, the lanthanum-containing mullite continuous fibers, unlike their precursor (lanthanum oxide-coated mullite continuous fibers), had no coating layer on a coating film on their surface. Instead, a uniform distribution of lanthanum was observed over approximately 50 nm (50±25 nm) from the fiber surface. This is a result of thermal diffusion (grain boundary diffusion) of the lanthanum oxide coating layer on the above lanthanum oxide-coated mullite fibers.

The concentration by mass of lanthanum in (metal content of) the lanthanum-containing mullite continuous fibers was approximately 100 ppm (100 ppm); the concentration by mass of the dopant metal element in (dopant lanthanum content of) the fibers was 100 ppm. The monofilament tensile strength of the fibers was 1.7 GPa. The mullite fibers used as source fibers in this example had a biphasic structure of mullite and alumina, and the size of alumina crystallites in the lanthanum-containing mullite continuous fibers (lanthanum-containing mullite-alumina continuous fibers) was 33.8 nm.

(Heat Resistance Evaluation)

The lanthanum-containing mullite continuous fibers of this example were heated in the air at 1300° C. for 100 hours. After the heat treatment, the lanthanum-containing mullite continuous fibers had a monofilament tensile strength of 1.3 GPa. The size of alumina crystallites in the heated fibers was 43.9 nm; the percentage growth of crystallites was 29.9%.

Separately, the lanthanum-containing mullite continuous fibers of this example were heated in the air at 1200° C. for 100 hours. After the heat treatment, the lanthanum-containing mullite continuous fibers had a lanthanum content of approximately 70 ppm (70 ppm), a dopant metal content of 70 ppm and a monofilament tensile strength of 1.5 GPa. The size of alumina crystallites in the heated fibers was 39.4 nm; the crystallite growth was 16.6%.

Example A2

The magnesium-containing mullite continuous fibers of this example were obtained in the same way as in Example A1, except that the La—AcAc complex was replaced with 0.4 g of magnesium(II) acetylacetonate hydrates (Mg $(CH_3COCHCOCH_3)_2 \cdot nH_2O$). The source fibers used in this example contained 24 ppm of magnesium as an impurity.

The concentration by mass of magnesium in (magnesium content of) the mullite continuous fibers (magnesium-containing mullite continuous fibers) of this example was approximately 40 ppm (40 ppm); the dopant magnesium content was 16 ppm. The monofilament tensile strength of the fibers was 1.6 GP, and the size of alumina crystallites in the fibers was 36.9 nm.

(Heat Resistance Evaluation)

Heat treatment was carried out in the same way as in Example A1, except that the magnesium-containing mullite continuous fibers of this example were used.

After heat treatment in the air at 1200° C. for 100 hours, the magnesium-containing ceramic continuous fibers had a magnesium concentration by mass of approximately 31 ppm (31 ppm), a dopant magnesium content of 7 ppm and a monofilament tensile strength of 1.4 GPa. The size of alumina crystallites in the heated fibers was 38.8 nm; the crystallite growth was 5.1%.

After heat treatment in the air at 1300° C. for 100 hours, furthermore, the magnesium-containing mullite continuous fibers had a monofilament tensile strength of 1.3 GPa. The size of alumina crystallites in the heated fibers was 40.2 nm; the crystallite growth was 8.9%.

Example A3

The cerium-containing mullite continuous fibers of this example were obtained in the same way as in Example A1, except that the La—AcAc complex was replaced with 0.4 g of cerium(III) acetylacetonate trihydrate (Ce $(CH_3COCHCOCH_3)_3 \cdot 3H_2O$).

The cerium content of the cerium-containing mullite continuous fibers of this example was approximately 94 ppm (94 ppm); the dopant cerium content was 94 ppm. The size of alumina crystallites in the fibers was 36.1 nm.

(Heat Resistance Evaluation)

The cerium-containing mullite continuous fibers of this example were heated in the air at 1300° C. for 100 hours. After the heat treatment, the cerium-containing mullite continuous fibers had a monofilament tensile strength of 1.2 GPa. The size of alumina crystallites in the heated fibers was 44.2 nm; the crystallite growth was 22.4%.

Example A4

The zirconium-containing mullite continuous fibers of this example were obtained in the same way as in Example A1, except that the La—AcAc complex was replaced with 0.4 g of zirconium(IV) acetylacetonate (Zr $(CH_3COCHCOCH_3)_4$). The source fibers used in this example contained 14 ppm of zirconium as an impurity.

The zirconium content of the mullite continuous fibers was approximately 88 ppm (88 ppm); the dopant zirconium content was 74 ppm. The size of alumina crystallites in the fibers was 34.5 nm.

(Heat Resistance Evaluation)

The zirconium-containing mullite continuous fibers of this example were heated in the air at 1300° C. for 100 hours. After the heat treatment, the zirconium-containing mullite continuous fibers had a monofilament tensile strength of 1.2 GPa. The size of alumina crystallites in the heated fibers was 49.4 nm; the crystallite growth was 43.2%.

Example A5

The neodymium-containing mullite continuous fibers of this example were obtained in the same way as in Example A1, except that the La—AcAc complex was replaced with 0.4 g of neodymium(III) acetylacetonate (Nd $(CH_3COCHCOCH_3)_4$).

The neodymium content of the neodymium-containing mullite continuous fibers of this example was approximately 64 ppm (64 ppm); the dopant neodymium content was 64 ppm. The size of alumina crystallites in the fibers was 41.2 nm.

(Heat Resistance Evaluation)

The neodymium-containing mullite continuous fibers of this example were heated in the air at 1300° C. for 100 hours. After the heat treatment, the size of alumina crystallites in the neodymium-containing mullite continuous fibers was 49.4 nm; the crystallite growth was 19.9%.

Example A6

The strontium-containing mullite continuous fibers of this example were obtained in the same way as in Example A1, except that the La—AcAc complex was replaced with 0.3 g of strontium(II) acetylacetonate hydrates (Sr $(CH_3COCHCOCH_3)_2 \cdot nH_2O$).

The strontium content of the strontium-containing mullite continuous fibers of this example was approximately 80 ppm (80 ppm); the dopant strontium content was 80 ppm. The size of alumina crystallites in the fibers was 40.0 nm.

(Heat Resistance Evaluation)

The strontium-containing mullite continuous fibers of this example were heated in the air at 1300° C. for 100 hours. After the heat treatment, the size of alumina crystallites in the strontium-containing mullite continuous fibers of this example was 47.4 nm; the crystallite growth was 18.5%.

Example A7

The yttrium-containing mullite continuous fibers of this example were obtained in the same way as in Example A1, except that the La—AcAc complex was replaced with 0.4 g of yttrium(III) acetylacetonate n-hydrates $(Y(CH_3COCHCOCH_3)_3 \cdot nH_2O)$.

The yttrium content of the yttrium-containing mullite continuous fibers of this example was approximately 76 ppm (76 ppm); the dopant yttrium content was 76 ppm. The size of alumina crystallites in the fibers was 33.3 nm.

(Heat Resistance Evaluation)

The yttrium-containing mullite continuous fibers of this example were heated in the air at 1300° C. for 100 hours. After the heat treatment, the yttrium-containing mullite continuous fibers had a monofilament tensile strength of 1.2 GPa. The size of alumina crystallites in the heated fibers was 44.4 nm; the crystallite growth was 33.3%.

Example A8

The ytterbium-containing mullite continuous fibers of this example were obtained in the same way as in Example A1, except that the La—AcAc complex was replaced with 0.4 g of ytterbium(III) acetylacetonate hydrates (Yb (CH₃COCHCOCH₃)₃·nH₂O).

The ytterbium-containing mullite continuous fibers of this example had an ytterbium content of 77 ppm and a dopant ytterbium content of 77 ppm. The size of alumina crystallites in the fibers was 41.2 nm.

A measured STEM-EDS spectrum of crystal grain boundaries in the mullite forming the ytterbium-containing mullite continuous fibers of this example is presented in FIG. 3. As indicated with "*" in FIG. 3 (*b*), a spectrum for ytterbium was detected in boundaries between the crystal grains forming the inside of the fibers, demonstrating the ytterbium-containing mullite continuous fibers of this example contained ytterbium in their crystal grain boundaries.

(Heat Resistance Evaluation)

The ytterbium-containing mullite continuous fibers of this example were heated in the air at 1300° C. for 100 hours. After the heat treatment, the ytterbium-containing mullite continuous fibers had a monofilament tensile strength of 1.4 GPa. The size of alumina crystallites in the heated fibers was 69.5 nm; the crystallite growth was 68.7%.

Example A9

The lutetium-containing mullite continuous fibers of this example were obtained in the same way as in Example A1, except that the La—AcAc complex was replaced with 0.4 g of lutetium(III) acetylacetonate hydrates (Lu (CH₃COCHCOCH₃)₃·nH₂O).

The lutetium content of the lutetium-containing mullite continuous fibers of this example was 120 ppm, the dopant lutetium content of the fibers was 120 ppm, the monofilament tensile strength of the fibers was 1.8 GPa, and the size of alumina crystallites in the fibers was 36.2 nm.

(Heat Resistance Evaluation)

The lutetium-containing mullite continuous fibers of this example were heated in the air at 1300° C. for 100 hours. After the heat treatment, the lutetium-containing mullite continuous fibers had a monofilament tensile strength of 1.2 GPa. The size of alumina crystallites in the heated fibers was 62.0 nm; the crystallite growth was 71.3%.

Example A10

The calcium-containing mullite continuous fibers of this example were obtained in the same way as in Example A1, except that the La—AcAc complex was replaced with 0.25 g of calcium(II) acetylacetonate hydrates (Ca (CH₃COCHCOCH₃)₂·nH₂O). The source fibers used in this example contained 21 ppm of calcium as an impurity.

The calcium content of the calcium-containing mullite continuous fibers of this example was 61 ppm, the dopant calcium content of the fibers was 40 ppm, the monofilament tensile strength of the fibers was 1.6 GPa, and the size of alumina crystallites in the fibers was 39.5 nm.

(Heat Resistance Evaluation)

The calcium-containing mullite continuous fibers of this example were heated in the air at 1300° C. for 100 hours. After the heat treatment, the calcium-containing mullite continuous fibers had a monofilament tensile strength of 1.3 GPa. The size of alumina crystallites in the heated fibers was 61.6 nm; the crystallite growth was 55.9%.

Example A11

The magnesium- and lutetium-containing mullite continuous fibers of this example were obtained by preparing magnesium-containing mullite fibers in the same way as in Example A2 and subjecting them to the same treatment as in Example A9. The source fibers used in this example contained 24 ppm of magnesium as an impurity.

The magnesium content and lutetium content of the magnesium- and lutetium-containing mullite continuous fibers were 40 ppm and 120 ppm, respectively; the dopant magnesium content and dopant lutetium content were 16 ppm and 120 ppm, respectively. The monofilament tensile strength of the fibers was 1.7 GPa, and the size of alumina crystallites in the fibers was 38.6 nm.

(Heat Resistance Evaluation)

The magnesium- and lutetium-containing mullite continuous fibers of this example were heated in the air at 1300° C. for 100 hours. After the heat treatment, the magnesium- and lutetium-containing mullite continuous fibers had a monofilament tensile strength of 1.2 GPa. The size of alumina crystallites in the heated fibers was 62.7 nm; the crystallite growth was 62.4%.

Comparative Example A1 (Mullite Continuous Fibers)

A commercially available mullite fiber cloth (the mullite continuous fibers used in Example A1) was desized by heating in the air at 800° C., and the product was used as the mullite fiber cloth (mullite continuous fibers) of this comparative example. The monofilament tensile strength of the mullite continuous fibers of this comparative example was 1.7 GPa, and the size of alumina crystallites in the fibers was 36.9 nm.

(Heat Resistance Evaluation)

The mullite fiber cloth of this comparative example was heated in the air at 1200° C. for 100 hours.

After the heat treatment, the mullite fiber cloth had a monofilament tensile strength of 1.3 GPa. The size of alumina crystallites in the heated fibers was 43.4 nm; the crystallite growth was 17.6%.

The mullite fiber cloth of this comparative example, furthermore, was heated in the air at 1300° C. for 100 hours. After the heat treatment, the mullite fiber cloth had a monofilament tensile strength of 1.0 GPa. The size of alumina crystallites in the heated cloth was 59.6 nm; the crystallite growth was 61.5%.

Overall, the metal-containing mullite continuous fibers of Examples A1 to A11 experienced reduced growth of alumina crystallites therein when heated, compared with the commercially available mullite continuous fibers in Comparative Example A1 heated in the same manner; the strength of the fibers was maintained. This demonstrates the metal-containing mullite continuous fibers of Examples A1 to A11 are highly heat-resistant compared with commercially available mullite continuous fibers.

Comparative Example A2

A commercially available mullite fiber cloth (the mullite continuous fibers used in Example A1) was desized by heating in the air at 800° C. The resulting cloth was heated in the air at 900° C. for 2 hours and then in the air at 1100° C. for 2 hours, and the product was used as the mullite fiber cloth (mullite continuous fibers) of this comparative example. The monofilament tensile strength of the mullite continuous fibers of this comparative example was 1.7 GPa, and the size of alumina crystallites in the fibers was 37.8 nm.

(Heat Resistance Evaluation)

The mullite fiber cloth of this comparative example was heated in the air at 1300° C. for 100 hours. After the heat treatment, the mullite fiber cloth had a monofilament tensile strength of 1.0 GPa. The size of alumina crystallites in the heated fibers was 60.2 nm; the crystallite growth was 59.3%.

The mullite continuous fibers of this comparative example were found to have a low monofilament tensile strength after heat treatment compared with the metal-containing mullite continuous fibers of the examples.

Example A12

The lanthanum-containing alumina continuous fibers of this example were obtained in the same way as in Example A1, except that the source fibers were an alumina fiber cloth (3M, Nextel 610) desized by heating in the air at 800° C.

The lanthanum content of the lanthanum-containing alumina continuous fibers of this example was approximately 130 ppm (130 ppm); the dopant lanthanum content was 130 ppm. The size of alumina crystallites in the fibers was 85.0 nm.

(Heat Resistance Evaluation)

The lanthanum-containing alumina continuous fibers of this example were heated in the air at 1300° C. for 100 hours. After the heat treatment, the lanthanum-containing alumina continuous fibers had a monofilament tensile strength of 1.2 GPa. The size of alumina crystallites in the heated fibers was 181.7 nm; the crystallite growth was 113.8%.

Example A13

The magnesium-containing alumina continuous fibers of this example were obtained in the same way as in Example A12, except that the La—AcAc complex was replaced with 0.4 g of magnesium(II) acetylacetonate hydrates (Mg $(CH_3COCHCOCH_3)_2 \cdot nH_2O$). The source fibers used in this example contained 25 ppm of magnesium as an impurity.

The magnesium content of the magnesium-containing alumina continuous fibers of this example was approximately 34 ppm (34 ppm); the dopant magnesium content was 9 ppm. The size of alumina crystallites in the fibers was 76.0 nm.

(Heat Resistance Evaluation)

The magnesium-containing alumina continuous fibers of this example were heated in the air at 1300° C. for 100 hours. After the heat treatment, the magnesium-containing alumina continuous fibers had a monofilament tensile strength of 1.1 GPa. The size of alumina crystallites in the heated fibers was 130.5 nm; the crystallite growth was 71.7%.

Example A14

The calcium-containing alumina continuous fibers of this example were obtained in the same way as in Example A12, except that the La—AcAc complex was replaced with 0.4 g of calcium(II) acetylacetonate hydrates (Ca $(CH_3COCHCOCH_3)_2 \cdot nH_2O$). The source fibers used in this example contained 20 ppm of calcium as an impurity.

The calcium content of the calcium-containing alumina continuous fibers of this example was approximately 40 ppm (40 ppm); the dopant calcium content was 20 ppm. The size of alumina crystallites in the fibers was 79.9 nm.

A measured STEM-EDS spectrum of crystal grain boundaries in the alumina forming the calcium-containing alumina continuous fibers of this example is presented in FIG. 4. As indicated with "*" in FIG. 4 (b), a spectrum for calcium was detected in boundaries between the crystal grains forming the inside of the fibers, demonstrating the calcium-containing alumina continuous fibers of this example contained calcium in their crystal grain boundaries.

(Heat Resistance Evaluation)

The calcium-containing alumina continuous fibers of this example were heated in the air at 1300° C. for 100 hours. After the heat treatment, the calcium-containing alumina continuous fibers had a monofilament tensile strength of 1.2 GPa. The size of alumina crystallites in the heated fibers was 132.4 nm; the crystallite growth was 65.7%.

Example A15

The neodymium-containing alumina continuous fibers of this example were obtained in the same way as in Example A12, except that the La—AcAc complex was replaced with 0.4 g of neodymium(III) acetylacetonate (Nd $(CH_3COCHCOCH_3)_4$).

The neodymium content of the neodymium-containing alumina continuous fibers of this example was approximately 63 ppm (63 ppm); the dopant neodymium content was 63 ppm. The size of alumina crystallites in the fibers was 78.0 nm.

(Heat Resistance Evaluation)

The neodymium-containing alumina continuous fibers of this example were heated in the air at 1300° C. for 100 hours. After the heat treatment, the neodymium-containing alumina continuous fibers had a monofilament tensile strength of 1.1 GPa. The size of alumina crystallites in the heated fibers was 201.4 nm; the crystallite growth was 158.2%.

Example A16

The zirconium-containing alumina continuous fibers of this example were obtained in the same way as in Example A12, except that the La—AcAc complex was replaced with 0.4 g of zirconium(IV) acetylacetonate (Zr $(CH_3COCHCOCH_3)_4$).

The zirconium content of the zirconium-containing alumina continuous fibers of this example was approximately 35 ppm (35 ppm); the dopant zirconium content was 35 ppm. The size of alumina crystallites in the fibers was 78.0 nm.

A measured STEM-EDS spectrum of crystal grain boundaries in the alumina forming the zirconium-containing alumina continuous fibers of this example is presented in FIG. 5. As indicated with "*" in FIG. 5 (b), a spectrum for zirconium was detected in boundaries between the crystal grains forming the inside of the fibers, demonstrating the zirconium-containing alumina continuous fibers of this example contained zirconium in their crystal grain boundaries.

(Heat Resistance Evaluation)

The zirconium-containing alumina continuous fibers of this example were heated in the air at 1300° C. for 100 hours. After the heat treatment, the zirconium-containing alumina continuous fibers had a monofilament tensile strength of 1.2 GPa. The size of alumina crystallites in the heated fibers was 117.3 nm; the crystallite growth was 50.4%.

Example A17

The strontium-containing alumina continuous fibers of this example were obtained in the same way as in Example A12, except that the La—AcAc complex was replaced with 0.3 g of strontium(II) acetylacetonate hydrates (Sr $(CH_3COCHCOCH_3)_2$·$nH_2O$).

The strontium content of the strontium-containing alumina continuous fibers of this example was approximately 100 ppm (100 ppm); the dopant strontium content was 100 ppm. The size of alumina crystallites in the fibers was 79.0 nm.

(Heat Resistance Evaluation)

The strontium-containing alumina continuous fibers of this example were heated in the air at 1300° C. for 100 hours. After the heat treatment, the strontium-containing alumina continuous fibers had a monofilament tensile strength of 1.2 GPa. The size of alumina crystallites in the heated fibers was 149.4 nm; the crystallite growth was 89.1%.

Example A18

The yttrium-containing alumina continuous fibers of this example were obtained in the same way as in Example A12, except that the La—AcAc complex was replaced with 0.4 g of yttrium(III) acetylacetonate n-hydrates $(Y(CH_3COCHCOCH_3)_3$·$nH_2O)$.

The yttrium content of the yttrium-containing alumina continuous fibers of this example was approximately 60 ppm (60 ppm); the dopant yttrium content was 60 ppm. The size of alumina crystallites in the fibers was 78.0 nm.

(Heat Resistance Evaluation)

The yttrium-containing alumina continuous fibers of this example were heated in the air at 1300° C. for 100 hours. After the heat treatment, the size of alumina crystallites in the yttrium-containing alumina continuous fibers was 151.9 nm; the crystallite growth was 94.7%.

Example A19

The lutetium-containing alumina continuous fibers of this example were obtained in the same way as in Example A12, except that the La—AcAc complex was replaced with 0.4 g of lutetium(III) acetylacetonate hydrates (Lu $(CH_3COCHCOCH_3)_3$·$nH_2O)$.

The lutetium content of the lutetium-containing alumina continuous fibers of this example was approximately 120 ppm; the dopant lutetium content was 120 ppm. The size of alumina crystallites in the fibers was 78.0 nm.

(Heat Resistance Evaluation)

The lutetium-containing alumina continuous fibers of this example were heated in the air at 1300° C. for 100 hours. After the heat treatment, the size of alumina crystallites in the lutetium-containing alumina continuous fibers was 157.1 nm; the crystallite growth was 101.4%.

Example A20

The lutetium-containing alumina continuous fibers of this example were obtained by repeating the same process as in Example A19 three times. That is, lutetium-containing alumina continuous fibers obtained in the same way as in Example A19 were subjected to two cycles of immersion in a lutetium acetylacetonate solution for 24 hours at room temperature, heating in the air at 900° C. for 2 hours and further heating in the air at 1100° C. for 2 hours, and the product was used as the lutetium-containing alumina continuous fibers of this example.

The lutetium content of the lutetium-containing alumina continuous fibers of this example was 380 ppm; the dopant lutetium content of the fibers was 380 ppm. The size of alumina crystallites in the fibers was 75.0 nm.

(Heat Resistance Evaluation)

The lutetium-containing alumina continuous fibers of this example were heated in the air at 1300° C. for 100 hours. After the heat treatment, the size of alumina crystallites in the lutetium-containing alumina continuous fibers was 106.5 nm; the crystallite growth was 42.0%.

Example A21

The ytterbium-containing alumina continuous fibers of this example were obtained in the same way as in Example A12, except that the La—AcAc complex was replaced with 0.4 g of ytterbium(III) acetylacetonate hydrates (Yb $(CH_3COCHCOCH_3)_3$·$nH_2O)$.

The ytterbium content of the ytterbium-containing alumina continuous fibers of this example was approximately 77 ppm; the dopant ytterbium content was 77 ppm. The size of alumina crystallites in the fibers was 78.0 nm.

(Heat Resistance Evaluation)

The ytterbium-containing alumina continuous fibers of this example were heated in the air at 1300° C. for 100 hours. After the heat treatment, the size of alumina crystallites in the ytterbium-containing alumina continuous fibers was 117.4 nm; the crystallite growth was 47.1%.

Example A22

The zirconium- and calcium-containing alumina continuous fibers of this example were obtained by preparing zirconium-containing alumina continuous fibers in the same way as in Example A16 and subjecting them to the same treatment as in Example A14. The source fibers used in this example contained 20 ppm of calcium as an impurity.

The zirconium- and calcium-containing alumina continuous fibers had a zirconium content and a calcium content of 27 ppm and 110 ppm, respectively, therefore having a dopant zirconium content and a dopant calcium content of 27 ppm and 90 ppm, respectively. The monofilament tensile strength of the fibers was 2.3 GPa, and the size of alumina crystallites in the fibers was 78.0 nm.

(Heat Resistance Evaluation)

The zirconium- and calcium-containing alumina continuous fibers of this example were heated in the air at 1300° C. for 100 hours. After the heat treatment, the zirconium- and calcium-containing alumina continuous fibers had a monofilament tensile strength of 1.3 GPa. The size of alumina crystallites in the heated fibers was 128.7 nm; the crystallite growth was 65.0%.

Example A23

The zirconium- and strontium-containing alumina continuous fibers of this example were obtained by preparing zirconium-containing alumina continuous fibers in the same way as in Example A16 and subjecting them to the same treatment as in Example A17.

The zirconium- and strontium-containing alumina continuous fibers had a zirconium content and a strontium content of 80 ppm and 190 ppm, respectively, therefore having a dopant zirconium content and a dopant strontium content of 80 ppm and 190 ppm, respectively. The monofilament tensile strength of the fibers was 2.4 GPa, and the size of alumina crystallites in the fibers was 76.0 nm.

(Heat Resistance Evaluation)

The zirconium- and strontium-containing alumina continuous fibers of this example were heated in the air at 1300° C. for 100 hours. After the heat treatment, the zirconium- and strontium-containing alumina continuous fibers had a monofilament tensile strength of 1.2 GPa. The size of alumina crystallites in the heated fibers was 120.3 nm; the crystallite growth was 58.3%.

Example A24

The zirconium-containing alumina continuous fibers of this example were obtained by preparing zirconium-containing alumina continuous fibers in the same way as in Example A16 and subjecting them to the same treatment as in Example A16 four times. That is, zirconium-containing alumina continuous fibers obtained in the same way as in Example A16 were subjected to four cycles of immersion in a zirconium acetylacetonate solution for 24 hours at room temperature, heating in the air at 900° C. for 2 hours and further heating in the air at 1100° C. for 2 hours, and the product was used as the zirconium-containing alumina continuous fibers of this example.

The zirconium-containing alumina continuous fibers of this example had a zirconium content of 200 ppm, therefore having a dopant zirconium content of 200 ppm. The size of alumina crystallites in the fibers was 78.0 nm.

(Heat Resistance Evaluation)

The zirconium-containing alumina continuous fibers of this example were heated in the air at 1300° C. for 100 hours. After the heat treatment, the zirconium-containing alumina continuous fibers had a monofilament tensile strength of 1.3 GPa. The size of alumina crystallites in the heated fibers was 149.5 nm; the crystallite growth was 91.7%.

Comparative Example A3

The commercially available alumina fiber cloth used in Example A12 was heated in the air at 800° C. (desized), and the product was used as the alumina fiber cloth (alumina continuous fibers) of this comparative example. The alumina continuous fibers of this comparative example had a monofilament tensile strength of 2.1 GPa. The size of alumina crystallites in the fibers was 77.2 nm.

(Heat Resistance Evaluation)

The alumina fiber cloth of this comparative example was heated in the air at 1300° C. for 100 hours. After the heat treatment, the alumina fiber cloth had a monofilament tensile strength of 1.0 GPa. The size of alumina crystallites in the heated fibers was 226.0 nm; the crystallite growth was 192.7%.

Comparative Example A4

0.4 g of zirconium(IV) acetylacetonate (Zr(CH₃COCHCOCH₃)₄) was dissolved in 200 mL of ethanol, and an alumina fiber cloth (model, Nextel 610; 3M) heated in the air at 800° C. (desized) was impregnated with the resulting zirconium-AcAc solution for 24 hours at room temperature.

After impregnation, the immersed alumina fiber cloth was heated in the air at 900° C. for 2 hours, yielding a zirconium oxide-coated alumina continuous fibers.

A measured STEM-EDS spectrum of crystal grain boundaries in the alumina forming the zirconium oxide-coated alumina continuous fibers of this comparative example is presented in FIG. 6. No spectrum for zirconium was detected in boundaries between the crystal grains forming the inside of the fibers, indicating zirconium oxide-coated aluminum alumina continuous fibers obtained via heat treatment at 900° C. for 2 hours contain no zirconium in their crystal grain boundaries.

Overall, the metal-containing alumina continuous fibers of Examples A12 to A24 experienced reduced growth of alumina crystallites therein when heated, compared with the commercially available alumina continuous fibers in Comparative Example A2 heated in the same manner. This demonstrates the metal-containing alumina continuous fibers of Examples A12 to A24 are highly heat-resistant compared with commercially available alumina continuous fibers.

Example B1

181.9 g of a-alumina powder having an average particle size of 0.19 μm, 5.6 g of silica powder having an average particle size of 0.20 μm and 58 g of purified water were mixed in a ball mill for 24 hours to give an alumina slurry. A stack of five pieces of the lanthanum-containing mullite continuous fiber cloth obtained in Example A1 was impregnated with the mixed slurry and heated at 120° C. for 4 hours. The heated product was air-dried at 120° C., yielding a green body 130 mm wide×110 mm long×approximately 2.5 mm thick. The green body was air-dried at 120° C. overnight, heated in the air at 900° C. for 2 hours and then heated in the air at 1100° C. for 2 hours. Then the product was heated in the air at 1200° C. for 100 hours. In this way, a sheet of CMC was obtained. The density of the resulting CMC was measured by the Archimedes method to be 2.48 g/cm³. The fiber content by volume was 33.8%, and the bulk tensile strength was 176 MPa.

Example B2

A sheet of CMC was obtained in the same way as in Example B1, except that the lanthanum-containing mullite continuous fiber cloth was replaced with the magnesium-containing mullite continuous fiber obtained in Example A2. The product was used as the CMC of this example. The resulting CMC had a density of 2.58 g/cm³, a fiber content by volume of 35.0% and a bulk tensile strength of 158 MPa.

The CMC of this example was then heated in the air at 1300° C. for 100 hours. After the heat treatment, the CMC had a bulk tensile strength of 87 MPa; the difference in bulk tensile strength was 71 MPa. The CMC of this example was also heated in the air at 1200° C. for 100 hours. After the heat treatment, the CMC had a bulk tensile strength of 152 MPa, indicating heat treatment at approximately 1200° C. caused little strength degradation.

Example B3

A sheet of CMC was obtained in the same way as in Example B1, except that the lanthanum-containing mullite continuous fiber cloth was replaced with the ytterbium-containing mullite continuous fiber obtained in Example A8. The product was used as the CMC of this example. The resulting CMC had a density of 2.59 g/cm³, a fiber content by volume of 42.0% and a bulk tensile strength of 179 MPa.

Example B4

A sheet of CMC was obtained in the same way as in Example B1, except that the lanthanum-containing mullite continuous fiber cloth was replaced with the zirconium-containing alumina continuous fiber obtained in Example A16. The product was used as the CMC of this example. The resulting CMC had a density of 2.78 g/cm$^3$, a fiber content by volume of 41.5% and a bulk tensile strength of 238 MPa.

The CMC of this example was heated in the air at 1300° C. for 100 hours. After the heat treatment, the bulk tensile strength of the CMC was 207 MPa; the difference in bulk tensile strength was 31 MPa. The strength degradation after heat treatment, therefore, was small compared with that of the CMC of Comparative Example B1, which was made with commercially available alumina continuous fibers. The CMC of this example was also heated in the air at 1200° C. for 1000 hours. After the heat treatment, the CMC had a bulk tensile strength of 231 MPa, indicating prolonged heat treatment at approximately 1200° C. caused little strength degradation.

Example B5

A sheet of CMC was obtained in the same way as in Example B1, except that the lanthanum-containing mullite continuous fiber cloth was replaced with the magnesium-containing alumina continuous fiber obtained in Example A13. The product was used as the CMC of this example. The resulting CMC had a density of 2.75 g/cm$^3$, a fiber content by volume of 37.5% and a bulk tensile strength of 217 MPa.

The CMC of this example was heated in the air at 1300° C. for 100 hours. After the heat treatment, the bulk tensile strength of the CMC was 176 MPa; the difference in bulk tensile strength was 41 MPa. The strength degradation after heat treatment was small compared with that of the CMC of Comparative Example B1, which was made with commercially available alumina continuous fibers.

Comparative Example B1

A sheet of CMC was obtained in the same way as in Example B1, except that the lanthanum-containing mullite continuous fiber cloth was replaced with a commercially available alumina continuous fiber cloth (the alumina fiber cloth (alumina continuous fibers in Comparative Example A3). The product was used as the CMC of this comparative example. The resulting CMC had a density of 2.73 g/cm$^3$, a fiber content by volume of 41.3% and a bulk tensile strength of 202 MPa.

The CMC of this comparative example was heated in the air at 1300° C. for 100 hours. After the heat treatment, the bulk tensile strength of the CMC was 132 MPa; the difference in bulk tensile strength was 70 MPa. The heat treatment at 1300° C., therefore, caused a great strength degradation.

Overall, the metal element-having ceramic continuous fibers of Examples A1 to A24, containing metal element(s) within the ceramic continuous fibers themselves, experience only modest growth of alumina crystallites therein when heated. The metal-containing ceramic continuous fibers of the examples, furthermore, lost little of their monofilament tensile strength upon heat treatment. Commercially available ceramic continuous fibers, by contrast, lost much of their monofilament tensile strength upon heat treatment, demonstrating superior heat resistance of metal element-having ceramic continuous fibers according to the present invention.

The CMCs of Examples B1 to B5, made with metal element-having ceramic continuous fibers, furthermore, were highly resistant to heat compared with CMCs made with commercially available ceramic continuous fibers.

These results indicate metal element-having ceramic continuous fibers according to the present invention are suitable for use in the production of ceramic matrix composite materials having sufficiently high strength.

INDUSTRIAL APPLICABILITY

The metal element-having ceramic continuous fibers according to the present invention can improve the heat resistance of commercially available ceramic continuous fibers and can be used as a CMC having high tensile strength. The metal element-having ceramic continuous fibers according to the present invention, furthermore, can be produced by impregnating continuous fibers with a solvent containing metal acetylacetonate complex(es) and heating the impregnated fibers. The doping treatment, therefore, is easy to do not only with two-dimensional, cloth-shaped textiles but also with textiles in three-dimensional, complicated shapes and nonwoven fabrics, making the present invention widely applicable in industry.

The description, claims, drawings and abstract of Japanese Patent Application Nos. 2020-162889, filed Sep. 29, 2020, and 2021-055040, filed Mar. 29, 2021, are hereby referenced and incorporated in their entirety as the disclosure of the description of the present disclosure.

The invention claimed is:

1. A ceramic continuous fiber comprising a ceramic continuous fiber and at least one metal element therein, with a concentration by mass of the metal element being 10 ppm or more and 1000 ppm or less, wherein the metal element is contained in crystal grain boundaries in a ceramic material forming the ceramic continuous fiber.

2. The ceramic continuous fiber according to claim 1, wherein the metal element is a metal element or elements that are neither iron nor aluminum.

3. The ceramic continuous fiber according to claim 1, wherein the metal element is one or more selected from the group consisting of sodium, potassium, magnesium, calcium, strontium, barium, lanthanum, cerium, praseodymium, promethium, samarium, europium, gadolinium, terbium, dysprosium, holmium, erbium, thulium, ytterbium, lutetium, yttrium, zirconium, neodymium, titanium, scandium, vanadium, chromium, manganese, cobalt, nickel and copper.

4. The ceramic continuous fiber according to claim 1, wherein the metal element is one or more selected from the group consisting of lanthanum, ytterbium, lutetium, magnesium, cerium, zirconium, neodymium, titanium, calcium, yttrium and strontium.

5. The ceramic continuous fiber according to claim 1, wherein the metal element is in a state of at least one of grain boundary diffusion or substitutional dissolution.

6. The ceramic continuous fiber according to claim 1, wherein the ceramic continuous fiber is a continuous fiber containing at least alumina.

7. The ceramic continuous fiber according to claim 1, wherein a percentage growth of crystallites after heat treatment in an air atmosphere at 1300° C. for 100 hours calculated according to equation (1) below is 160% or less:

$$G = \{(d_b - d_a)/d_a\} \times 100 \tag{1}$$

where G is the percentage growth (%) of crystallites, $d_a$ is a size (nm) of crystallites of a fiber-forming substance in the ceramic continuous fiber before the heat treatment, and $d_b$ is a size (nm) of crystallites of the fiber-forming substance in the ceramic continuous fiber after the heat treatment.

8. The ceramic continuous fiber according to claim 1, wherein the ceramic continuous fiber is an alumina continuous fiber or mullite continuous fiber.

9. A ceramic matrix composite material comprising the ceramic continuous fiber according to claim 1.

10. The ceramic matrix composite material according to claim 9, wherein a ceramic matrix or matrices forming the ceramic matrix composite material are at least any one selected from the group of alumina, mullite, zirconia and silica.

11. The ceramic matrix composite material according to claim 9, wherein a difference between bulk tensile strength of the material before heat treatment in an air atmosphere at 1300° C. for 100 hours and bulk tensile strength of the material after the heat treatment is 100 MPa or less.

12. A method for producing the ceramic continuous fiber according to claim 1, the method comprising an immersion step in which a ceramic continuous fiber is immersed in a solution containing at least one metal acetylacetonate complex and a step of heating the ceramic continuous fiber at 950° C. or above and 1300° C. or below.

13. The method according to claim 12 for producing a ceramic continuous fiber, wherein the metal acetylacetonate complex is an acetylacetonate complex or complexes containing one or more selected from the group of lanthanum, ytterbium, lutetium, magnesium, zirconium, cerium, yttrium, titanium, sodium, potassium, calcium, scandium, vanadium, chromium, manganese, cobalt, nickel, copper, zinc, gallium and strontium.

14. A method for producing a ceramic matrix composite material, the method comprising combining the ceramic continuous fiber according to claim 1 and a ceramic matrix into a composite.

* * * * *